United States Patent
Mermel et al.

(10) Patent No.: US 12,444,044 B2
(45) Date of Patent: Oct. 14, 2025

(54) ARTIFICIAL INTELLIGENCE PREDICTION OF PROSTATE CANCER OUTCOMES

(71) Applicant: Verily Life Sciences LLC, South San Francisco, CA (US)

(72) Inventors: Craig Mermel, Los Gatos, CA (US); Yun Liu, Mountain View, CA (US); Naren Manoj, Mountain View, CA (US); Matthew Symonds, Mountain View, CA (US); Martin Stumpe, Mountain View, CA (US); Lily Peng, Mountain View, CA (US); Kunal Nagpal, Mountain View, CA (US); Ellery Wulczyn, Mountain View, CA (US); Davis Foote, Mountain View, CA (US); David F. Steiner, Mountain View, CA (US); Po-Hsuan Cameron Chen, Palo Alto, CA (US)

(73) Assignee: Verily Life Sciences LLC, Dallas, TX (US)

( * ) Notice: Subject to any disclaimer, the term of this patent is extended or adjusted under 35 U.S.C. 154(b) by 522 days.

(21) Appl. No.: 17/453,953

(22) Filed: Nov. 8, 2021

(65) Prior Publication Data

US 2022/0148169 A1 May 12, 2022

Related U.S. Application Data

(60) Provisional application No. 63/110,786, filed on Nov. 6, 2020.

(51) Int. Cl.
*G06K 9/00* (2022.01)
*A61B 5/00* (2006.01)
(Continued)

(52) U.S. Cl.
CPC .......... *G06T 7/0012* (2013.01); *A61B 5/7275* (2013.01); *G06F 18/21* (2023.01);
(Continued)

(58) Field of Classification Search
CPC ......... G06T 7/0012; G06T 2207/20081; G06T 2207/30024; G06T 2207/30081;
(Continued)

(56) References Cited

U.S. PATENT DOCUMENTS

2007/0019854 A1* 1/2007 Gholap ................ G06T 7/0012
382/133
2013/0308849 A1* 11/2013 Fei ........................ G06T 7/0012
382/131

(Continued)

FOREIGN PATENT DOCUMENTS

WO 2019190518 10/2019

OTHER PUBLICATIONS

Cox, D. R. Regression models and life-tables. in Springer Series in Statistics (eds Kotz, S., & Johnson, N. L.) 527-541 (Springer, New York, NY, 1992) (Year: 1992).*

(Continued)

*Primary Examiner* — Alex Kok S Liew
(74) *Attorney, Agent, or Firm* — Kilpatrick Townsend & Stockton LLP

(57) ABSTRACT

One example method for AI prediction of prostate cancer outcomes involves receiving an image of prostate tissue; assigning Gleason pattern values to one or more regions within the image using an artificial intelligence Gleason grading model, the model trained to identify Gleason patterns on a patch-by-patch basis in a prostate tissue image; determining relative areal proportions of the Gleason patterns within the image; assigning at least one of a risk score or risk group value to the image based on the determined (Continued)

relative areal proportions; and outputting at least one of the risk score or the risk group value.

20 Claims, 19 Drawing Sheets

(51) Int. Cl.
    *G06F 18/21* (2023.01)
    *G06T 7/00* (2017.01)
(52) U.S. Cl.
    CPC ............... *G06T 2207/20081* (2013.01); *G06T 2207/30024* (2013.01); *G06T 2207/30081* (2013.01); *G06T 2207/30096* (2013.01); *G06V 2201/031* (2022.01)
(58) Field of Classification Search
    CPC . G06T 2207/30096; G06T 2207/10104; G06T 2207/10108; G06T 2207/10081; G06T 2207/30068; G06T 2207/10088; G06T 2207/20076; G06T 11/008; G06T 2207/20084; G06T 7/0014; G06T 11/60; G06T 7/11; G06T 2207/10132; G06T 2200/24; G06T 11/001; G06T 15/08; G06T 2207/10024; G06T 2207/10056; G06T 2207/20221; G06T 3/4046; G06T 7/62; A61B 5/7275; A61B 5/4381; A61B 5/7264; A61B 6/032; A61B 6/037; A61B 5/055; A61B 2576/02; A61B 5/0075; A61B 5/0091; A61B 6/5217; A61B 6/466; A61B 2576/026; A61B 6/463; A61B 6/481; A61B 6/501; A61B 6/505; A61B 6/507; A61B 6/5205; A61B 6/5241; A61B 6/5247; A61B 6/541; A61B 10/0041; A61B 6/03; A61B 6/502; A61B 8/0825; A61B 8/085; A61B 8/5223; A61B 2034/2051; A61B 2034/2055; A61B 2034/2059; A61B 6/5229; A61B 6/563; A61B 8/0833; A61B 8/0841; G06F 18/21; G06V 2201/031; G06V 10/82; G16H 30/40; G16H 50/30; G16H 50/20; G16H 50/50; G16H 50/70; G16H 30/20; G16H 10/60; G16H 10/20
    See application file for complete search history.

(56) References Cited

U.S. PATENT DOCUMENTS

| | | | | |
|---|---|---|---|---|
| 2014/0233826 | A1* | 8/2014 | Agaian | G06V 20/698 |
| | | | | 382/133 |
| 2016/0350946 | A1* | 12/2016 | Schieke | G06T 11/008 |
| 2017/0032090 | A1* | 2/2017 | Kamen | G06N 20/00 |
| 2017/0073778 | A1 | 3/2017 | Hoffmann et al. | |
| 2017/0169276 | A1 | 6/2017 | Agaian et al. | |
| 2019/0340468 | A1* | 11/2019 | Stumpe | G16H 30/40 |
| 2019/0370965 | A1* | 12/2019 | Lay | G06N 20/00 |
| 2020/0015734 | A1* | 1/2020 | Mayer | A61B 5/055 |
| 2020/0263255 | A1* | 8/2020 | Luca | C12Q 1/6886 |
| 2021/0304405 | A1* | 9/2021 | Cho | G16H 30/40 |

OTHER PUBLICATIONS

Arvaniti, Eirini, et al. "Automated Gleason grading of prostate cancer tissue microarrays via deep learning." Scientific reports 8.1 (2018), pp. 1-11. (Year: 2018).*
Nir, Guy, et al. "Comparison of artificial intelligence techniques to evaluate performance of a classifier for automatic grading of prostate cancer from digitized histopathologic images." JAMA network open 2.3 (2019), pp. 1-10 (Year: 2019).*
Ryu, Han Suk, et al. "Automated Gleason scoring and tumor quantification in prostate core needle biopsy images using deep neural networks and its comparison with pathologist-based assessment." Cancers 11.12 (Nov. 25, 2019), pp. 1-14 (Year: 2019).*
Li, Yuchun, et al. "Automated gleason grading and gleason pattern region segmentation based on deep learning for pathological images of prostate cancer." IEEE Access 8 (Jul. 7, 2020), pp. 117714-117725. (Year: 2020).*
Nagpal, Kunal, et al. "Development and validation of a deep learning algorithm for Gleason grading of prostate cancer from biopsy specimens." JAMA oncology 6.9 (Jul. 23, 2020), pp. 1372-1380 (Year: 2020).*
Bulten et al., "Automated deep-learning system for Gleason grading of prostate cancer using biopsies: a diagnostic study", The Lancet Oncology 21.2 (2020): 233-241.
Cai et al., "Proxylessnas: Direct neural architecture search on target task and hardware", arXiv preprint arXiv:1812.00332 (2018).
Chollet, "Xception: Deep learning with depthwise separable convolutions", Proceedings of the IEEE conference on computer vision and pattern recognition. 2017.
He, "Deep residual learning for image recognition", Proceedings of the IEEE conference on computer vision and pattern recognition. 2016.
Nagpal et al., "Development and validation of a deep learning algorithm for Gleason grading of prostate cancer from biopsy specimens", JAMA oncology 6.9 (2020): 1372-1380.
Nagpal et al., "Development and validation of a deep learning algorithm for improving Gleason scoring of prostate cancer", NPJ digital medicine 2.1 (2019): 1-10.
Ström et al., "Artificial intelligence for diagnosis and grading of prostate cancer in biopsies: a population-based, diagnostic study", The Lancet Oncology 21.2 (2020): 222-232.
Wulczyn et al., "A.I.-based Gleason Grading for Effective Stratification of Prostate Cancer Outcomes", 2020, 26 pages.
Yamamoto et al., "Automated acquisition of explainable knowledge from unannotated histopathology images", Nature communications 10.1 (2019): 1-9.
International Application No. PCT/US2021/072277, International Search Report and Written Opinion, Mailed On Feb. 3, 2022, 10 pages.
EP21890346.6, "Extended European Search Report", Sep. 20, 2024, 10 pages.
Pinckaers, et al., "Detection of Prostate Cancer in Whole-slide Images Through End-to-end Training With Image-level Labels", Institute of Electrical and Electronics Engineers Transactions on Medical Imaging, vol. 40, No. 7, Jun. 5, 2020, pp. 1817-1826.

* cited by examiner

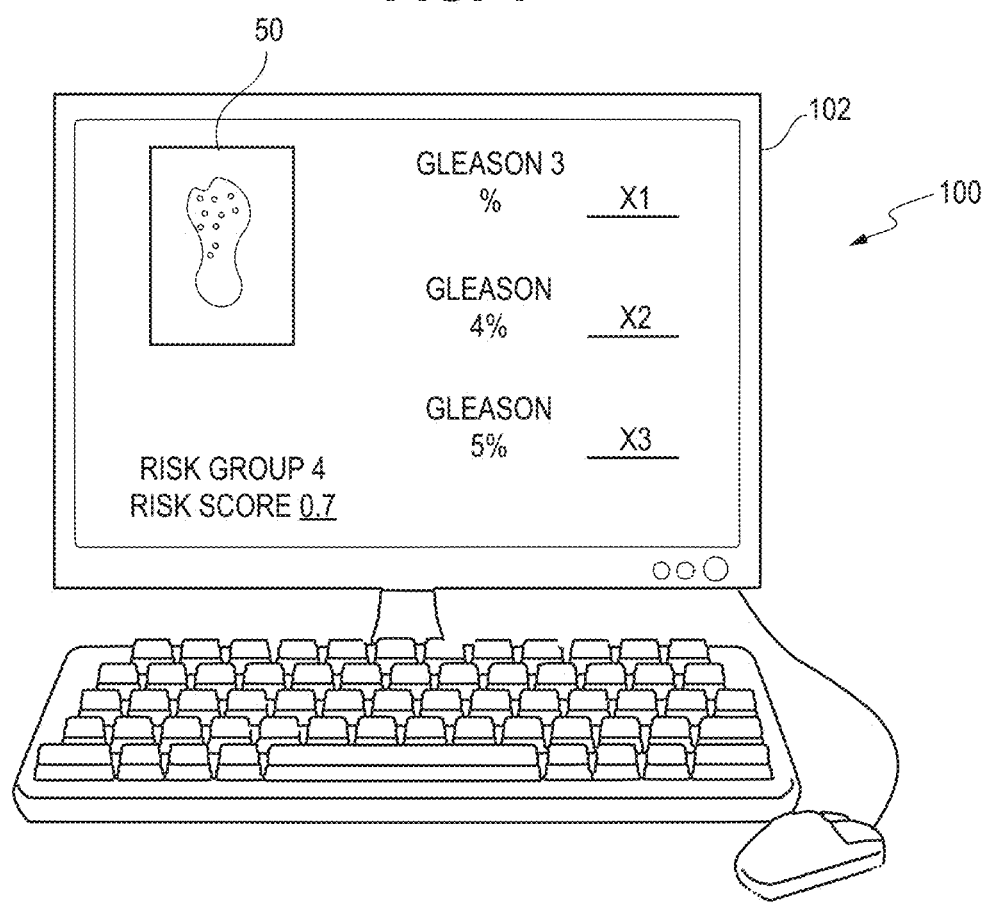

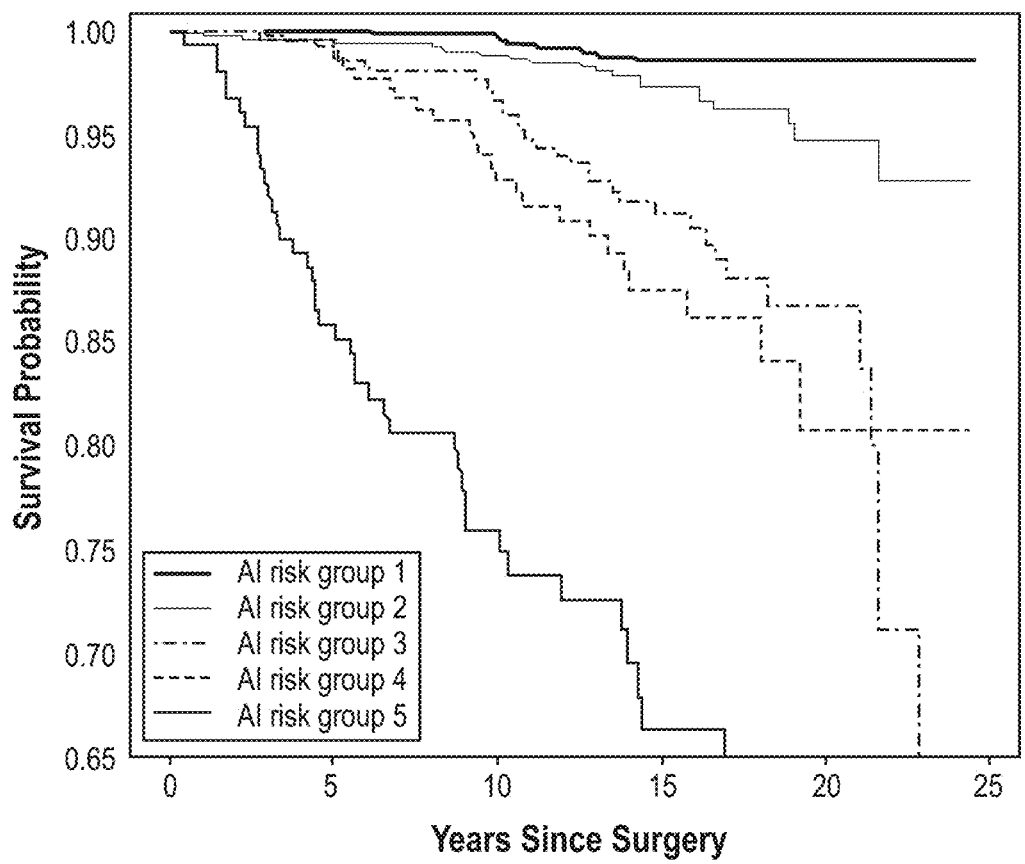

Sub-stratification of patients by A.I. as Risk Groups 1-2 vs. 3-5 within each pathologist-determined GG.

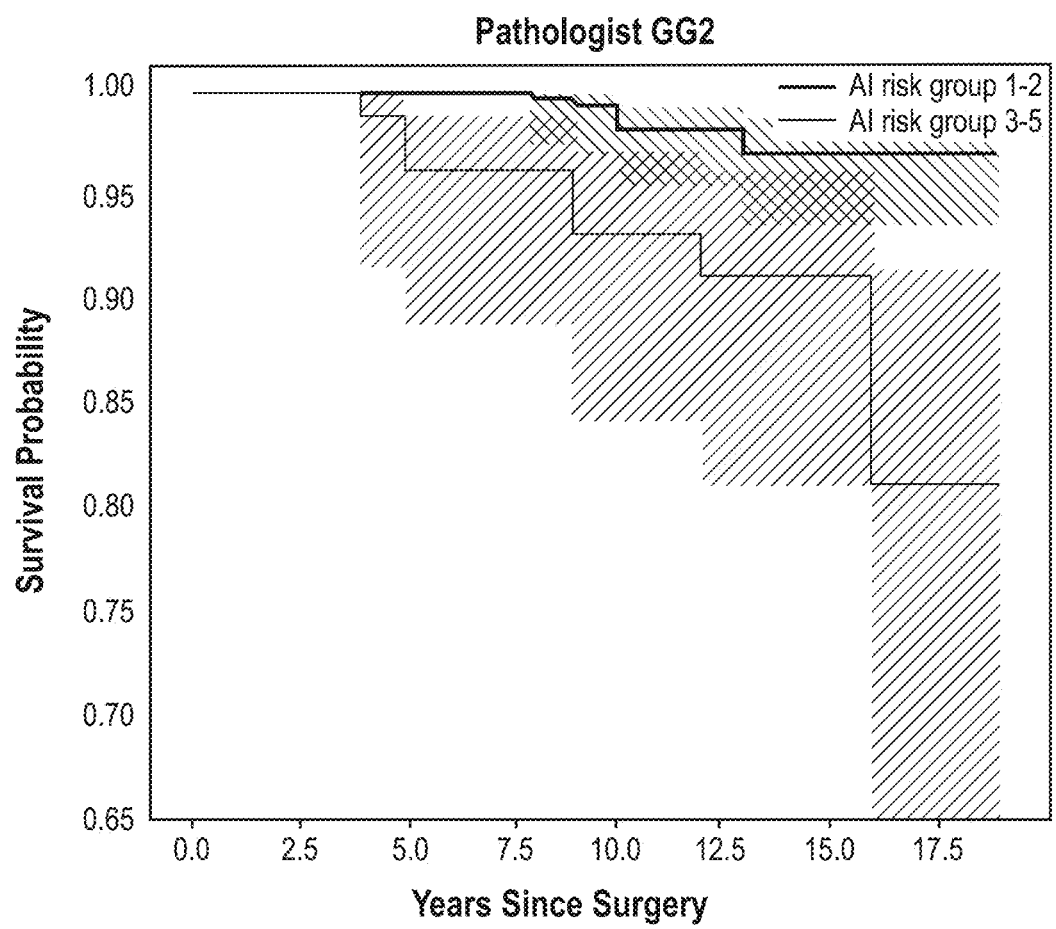

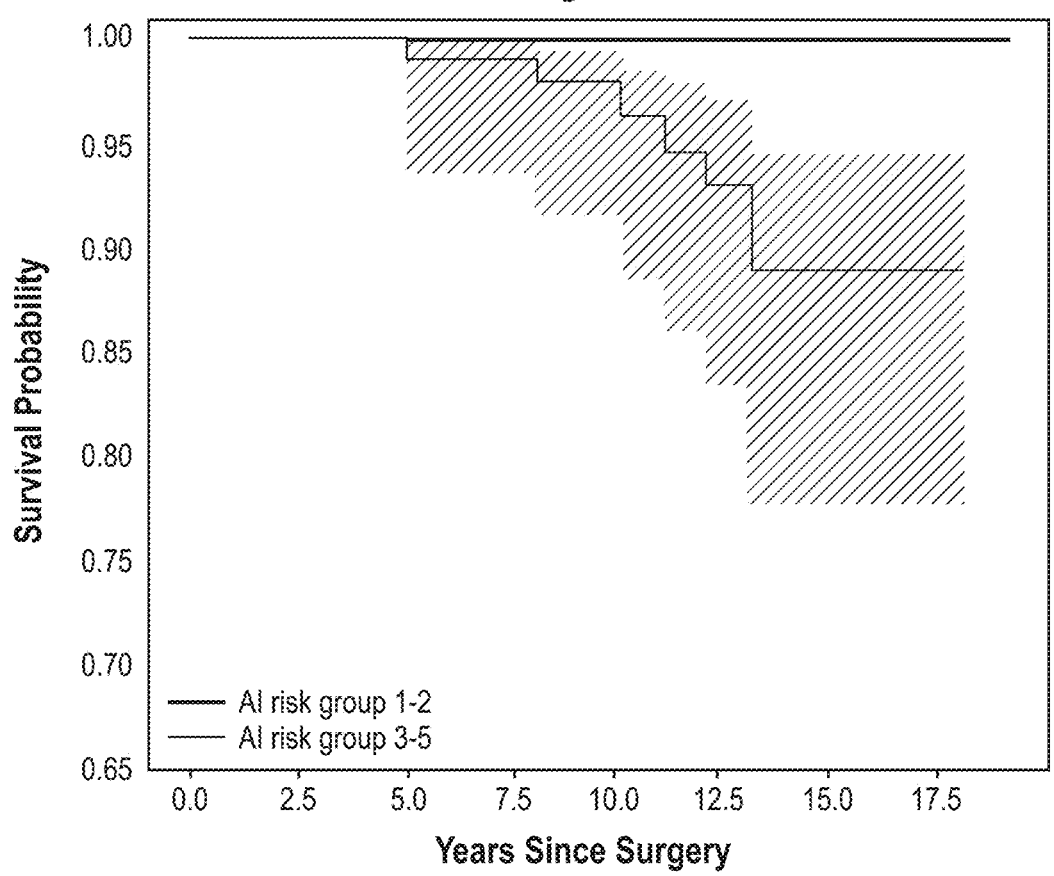

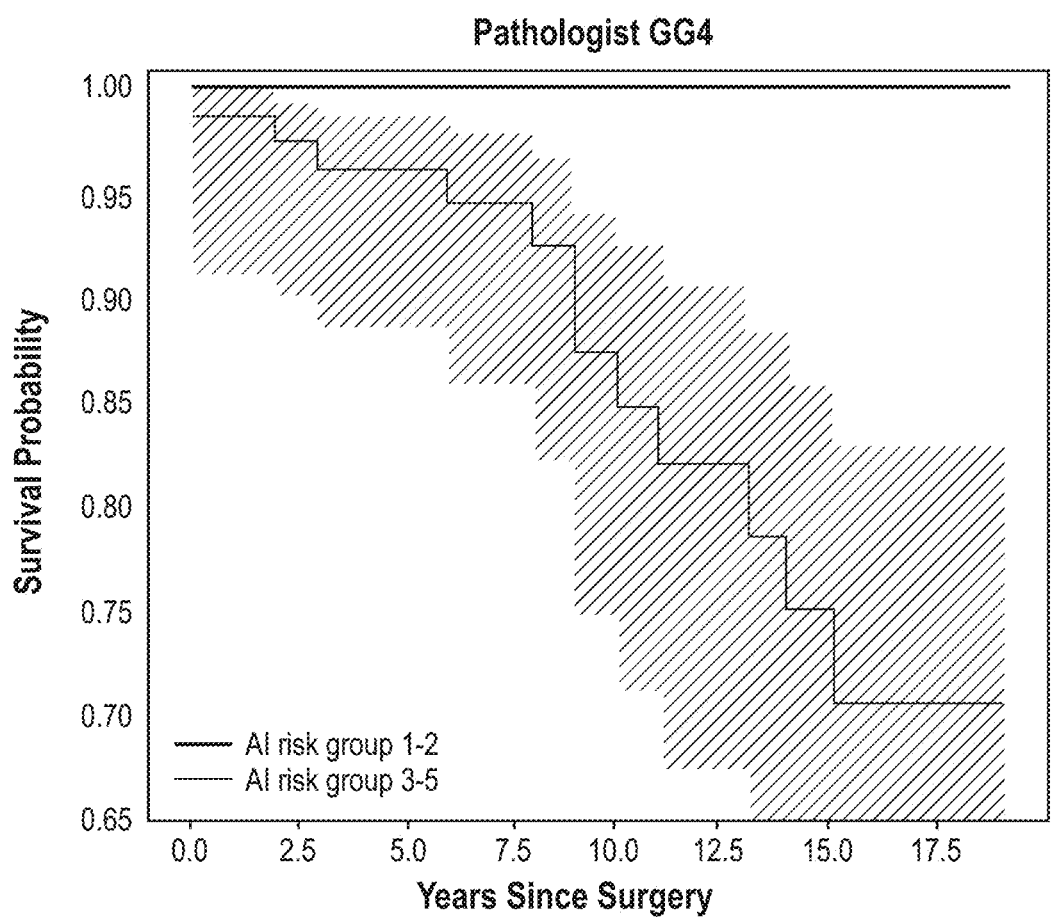

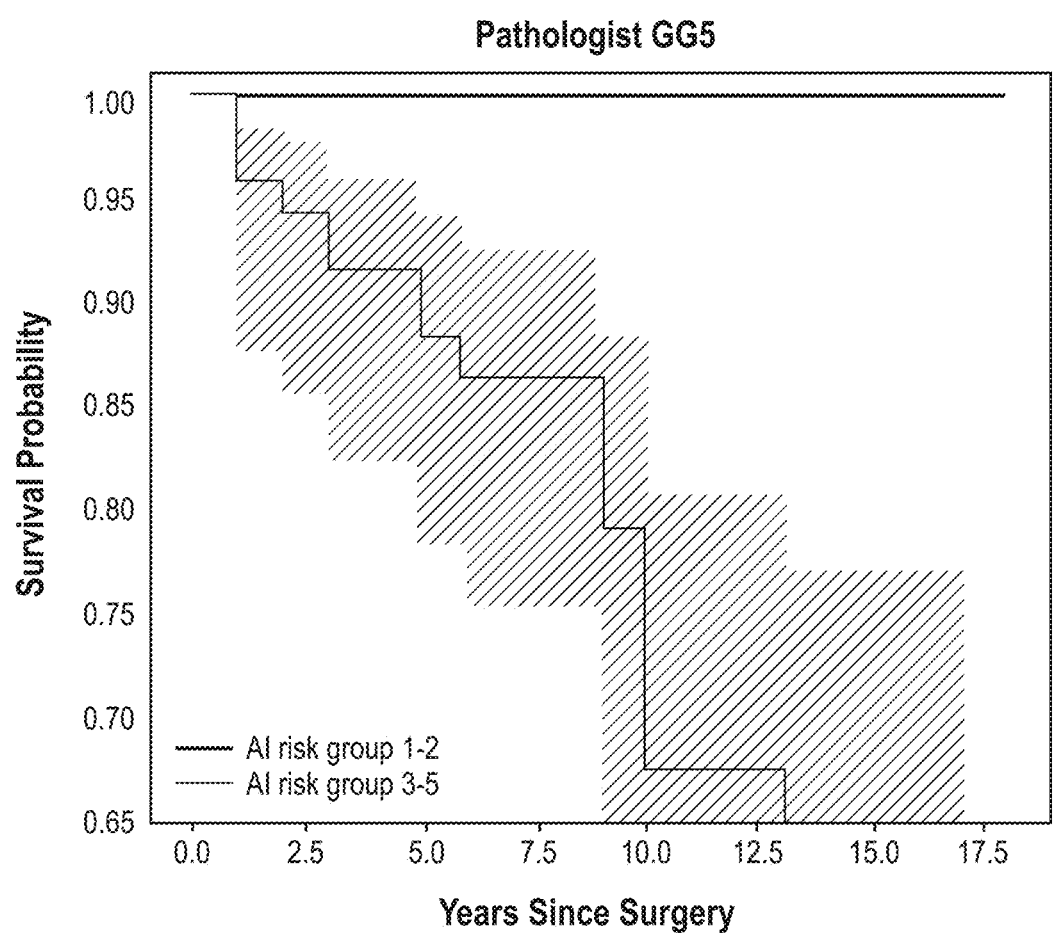

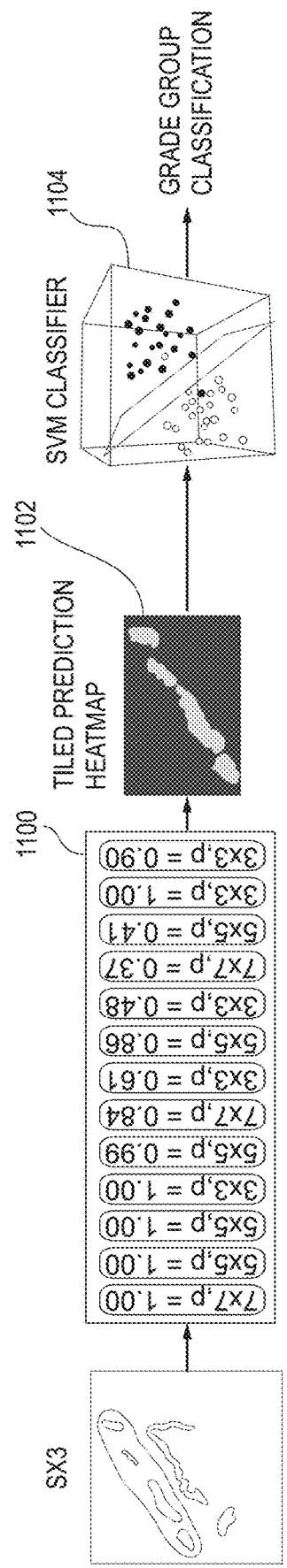

ARTIFICIAL INTELLIGENCE PREDICTION OF PROSTATE CANCER OUTCOMES

CROSS-REFERENCE TO RELATED APPLICATIONS

This application claims priority to U.S. Provisional Patent Application No. 63/110,786 filed Nov. 6, 2020, entitled "Artificial Intelligence Prediction Of Prostate Cancer Outcomes," which is related to U.S. provisional application Ser. No. 63/001,664 filed Mar. 30, 2020, entitled "Artificial Intelligence-based assistant for concurrent review of needle core prostate biopsies," the entire content of each which are incorporated by reference herein.

FIELD

The present application generally relates to artificial intelligence systems and methods for tumor analysis, and more specifically relates to artificial intelligence prediction of prostate cancer outcomes.

BACKGROUND

Prostate cancer affects 1 in 9 men in their lifetime but disease aggressiveness and prognosis can vary substantially among individuals based on factors such as the cancer grade. Gleason grading of prostate cancer involves assigning different histologic patterns, known as Gleason patterns, to each region of a patient's tumor. Based on the prevalence of these patterns, one of five Gleason Grade Groups (GG), i.e., GG1, GG2, GG3, GG4 or GG5, is assigned. A patient's prognosis worsens as the Gleason grade group grade increases. The resulting GG is among the most prognostic factors for prostate cancer patients, and is used for patient risk stratification and to match patients to treatment plans most appropriate for their risk of disease progression.

The Gleason system is used at distinct points in the clinical management of prostate cancer. First, for patients undergoing diagnostic biopsies, if tumor is identified, the GG impacts the decision between active surveillance versus definitive treatment options such as surgical removal of the prostate or radiation therapy. For patients who subsequently undergo a surgical resection of the prostate (radical prostatectomy), the GG is one key component of decisions regarding additional treatment such as radiotherapy or hormone therapy. In large clinical trials, use of adjuvant therapy following prostatectomy has demonstrated benefits such as improved progression-free survival for some patients, but can also result in adverse side effects. Given the tradeoff between potential benefit and toxicity for these adjuvant treatments, identifying the patients most likely to benefit from adjuvant treatment remains an important area of investigation in prostate cancer care.

SUMMARY

Various examples are described for artificial intelligence prediction of prostate cancer outcomes. One example method includes receiving an image of prostate tissue; assigning Gleason pattern values to one or more regions within the image using an artificial intelligence Gleason grading model, the model trained to identify Gleason patterns on a patch-by-patch basis in a prostate tissue image; determining relative areal proportions of the Gleason patterns within the image; assigning at least one of a risk score or risk group value to the image based on the determined relative areal proportions; and outputting at least one of the risk score or the risk group value.

One example system for assessing a prognosis of a prostate cancer patient includes a non-transitory computer-readable medium; and one or more processors communicatively coupled to the non-transitory computer-readable medium, the one or more processors configured to execute processor-executable instructions stored in the non-transitory computer-readable medium to receive an image of prostate tissue; assign Gleason pattern values to one or more regions within the image using an artificial intelligence Gleason grading model, the model trained to identify Gleason patterns on a patch-by-patch basis in a prostate tissue image; determine relative areal proportions of the Gleason patterns within the image; assign at least one of a risk score or risk group value to the image based on the determined relative areal proportions; and output at least one of the risk score or the risk group value.

One example non-transitory computer-readable medium comprising processor-executable instructions configured to cause one or more to receive an image of prostate tissue; assign Gleason pattern values to one or more regions within the image using an artificial intelligence Gleason grading model, the model trained to identify Gleason patterns on a patch-by-patch basis in a prostate tissue image; determine relative areal proportions of the Gleason patterns within the image; assign at least one of a risk score or risk group value to the image based on the determined relative areal proportions; and output at least one of the risk score or the risk group value.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 4 is an illustration of one possible example of how the AI risk group score ("4" in this example) could be presented on a workstation used by a clinician, e.g., primary care physician, oncologist, pathologist, etc.

FIGS. 5A-5C are Kaplan-Meier curves of survival probability as a function of time for the risk groups assigned for members of a validation set.

FIGS. 6A-6E are Kaplan-Meier plots showing the sub-stratification of patients by risk groups 1-2 vs. 3-5 within each pathologist-determine Gleason Grade.

FIG. 8 is an illustration of one possible embodiment of the deep learning system of FIGS. 1 and 2 which assigns Gleason patterns on a patch-by-patch basis and an overall Gleason Grade for a prostate tissue image.

DETAILED DESCRIPTION

Figure 1:
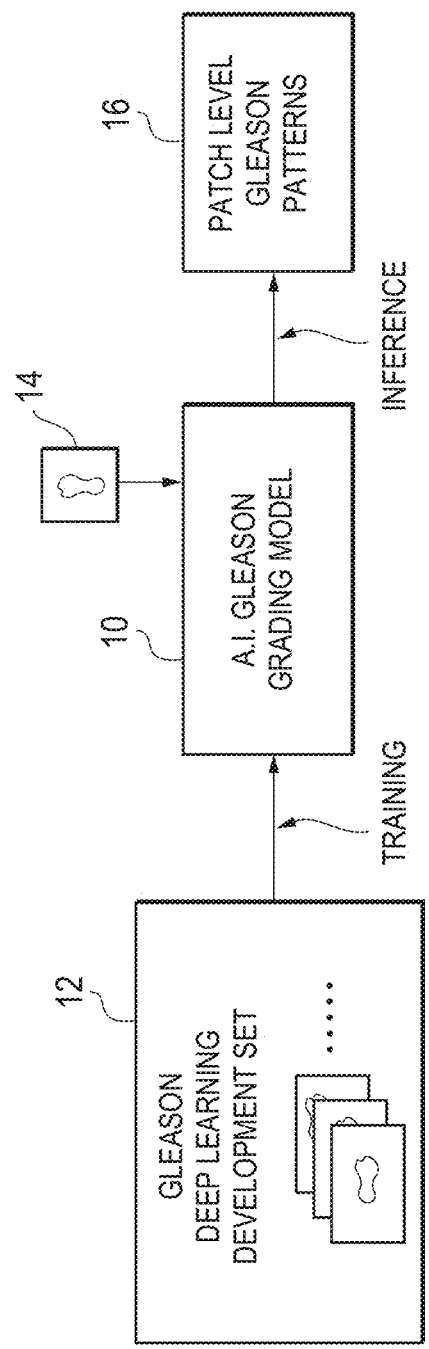
FIG. 1 is an illustration showing the development of a deep learning system in the form of an AI Gleason Grading Model, which generates Gleason pattern predictions for a digital prostate sample image on an image patch-by-patch basis.

Examples are described herein in the context of artificial intelligence prediction of prostate cancer outcomes. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Due to the complexity and intrinsic subjectivity of the system, Gleason grading suffers from large discordance rates between pathologists (30-50%), thus introducing a potential source of variability and prognostic inaccuracies. However, grades from experts (such as those with urologic subspeciality training) are more consistent and result in more accurate risk stratification than grades from less experienced pathologists, suggesting an opportunity to improve the clinical utility of the system by improving grading consistency and accuracy. To this end, several AI algorithms for Gleason grading have been developed and validated using expert-provided Gleason scores. See e.g., Nagpal, K. et al. *Development and validation of a deep learning algorithm for improving Gleason scoring of prostate cancer*, NPJ Digit Med 2, 48 (2019), and Nagpal, K. et al., *Development and Validation of a Deep Learning Algorithm for Gleason Grading of Prostate Cancer From Biopsy Specimens*, JAMA Oncol (2020), the content of both of which is incorporated by reference herein. However, an evaluation of the prognostic value of the algorithms and a direct comparison to the prognostic value of Gleason grading provided by pathologists has not, to our knowledge, been conducted. While the GG for biopsies as well as prostatectomy specimens both provide important prognostic information, retrospective studies to evaluate long-term clinical outcomes is more straightforward from prostatectomy cases given widely divergent treatment pathways following biopsy alone.

To address these issues, a new prognostic risk score paradigm may be used, including a continuous artificial intelligence ("AI") risk score, and then further discretizing these risk scores into new AI "risk groups." The risk score can be reported, or the risk group value, or both, for a given prostate tissue image. The use of a system to analyze images of prostate tissue to generate such AI risk scores or AI risk groups enables predicting prostate cancer patient prognosis directly from a digital image of a prostate cancer specimen, such as a needle core biopsy or prostatectomy specimen. Further, such techniques may be used to generate either a stand-alone prediction, or as a second read, or in a combined system in which the risk score or risk group value is combined with the pathologist's own Gleason Grade evaluation of the specimen.

In one example implementation, a system can assign Gleason pattern categorizations (e.g., 3, 4, or 5) to regions of an image of prostate tissue from the patient containing tumor cells using an artificial intelligence Gleason grading model, the model trained to identify Gleason patterns on a patch-by-patch basis in a prostate tissue image. It can then determine the relative areal proportions, e.g., percentages of the Gleason pattern categorizations, such as the relative size or area of tumor patches graded Gleason pattern 3, 4, and 5.

The system can then assign a risk score or risk group value, or both, to the image using the determined relative proportions. The risk score or risk group value is correlated to prognosis of the patient. Further, in some cases, the assigning step can make use of a Cox proportional hazards regression model fitted to a set of Gleason pattern scores or proportions thereof assigned to a multitude of images in a data set by the AI Gleason grading model and associated survival data associated with the data set.

To provide a suitable sample, the image of the prostate tissue can be an image of a specimen obtained from a prostatectomy or it could be of a specimen obtained from a needle core biopsy. To generate such an image, the specimen (or portion thereof) is placed on a tissue slide and imaged with a digital whole slide scanner at some particular magnification or combination of magnifications, such as 40× or 10×, as is conventional.

The system can also present the risk score, risk group values, or both, on a workstation used by clinician, such as for example a pathologist or oncologist. Note that the term "workstation" is intended to be interpreted broadly to encompass any computer device with a display and user interface for interacting with the display, including a desktop computer, tablet, smart phone, laptop computer and the like.

In one embodiment the workstation has an interface providing a feature for the pathologist or oncologist to input a human-derived Gleason Grade for the image, e.g., after visual examination of the specimen with a microscope or by study of a magnified digital image of the specimen. This feature can facilitate a comparison of the risk score, risk group value, or both, to the human-derived Gleason Grade. For example, the risk group values take on values of 1, 2, 3, 4 or 5 and correspond at least approximately to GG of 1, 2, 3, 4, and 5 (respectively). In case of discordance between the risk group valuation and the Gleason Grade the user (pathologist or oncologist) may be motivated to reconsider their own Gleason grade group assignment or perhaps take the risk group value in consideration along with the pathologist Gleason Grade group assignment when planning a course of treatment for the patient.

It is also envisioned that the risk group valuation can be combined with a human-derived Gleason Grade in an ensemble manner, including for example computing an average of the two values.

As noted above, in some examples, the risk group values can take the form of integers from 1 to 5, inclusive. The survival probability of each of the risk group values approximates the survival probability of prostate cancer patients with Gleason Grades of integers 1-5 inclusive, respectively. However, based on the systems and methods according to this disclosure, an AI risk group may not only approximate the prognosis provided by Gleason Grade group, but can provide a grouping system that more accurately categorizes patients based on more complex Gleason pattern thresholds. In particular, whereas the current Gleason grade group system uses "simple" thresholds (e.g. GG1 vs GG2 vs. GG3 essentially is >0% or >50% pattern 4 respectively), example systems according this disclosure may provide more precise groupings that better correlate with prognosis.

In still another aspect, a method is described for developing a model for predicting prognosis of a prostate cancer patient, which includes a system that can obtain a data set comprising a multitude of prostate cancer tissue images and associated survival data for prostate cancer patients associated with the tissue images. It can then assign Gleason patterns to regions of each image containing tumor cells using an artificial intelligence Gleason grading model, the model trained to identify Gleason patterns on a patch-by-patch basis in a prostate tissue image.

Subsequently, the system determines the relative areal proportions of the Gleason patterns in each of the images assigned by the artificial intelligence Gleason grading model and performs a Cox proportional hazards regression on the relative proportions and the survival data to generate continuous risk scores associated with prognosis for the patients in the data set. It can then define discrete risk group values from the continuous risk scores.

As will be appreciated from the following description, the present methods can be implemented in a computing environment including a processing unit and a machine-readable memory storing program instructions. The computing environment could be local to the clinician, such as executed in a processing unit and memory of a workstation. As an alternative, the computing environment could be in a remote server or cloud environment, in which the Gleason grading model is implemented in a remote computer from the clinician workstation, receives images over a network, determines the Gleason patterns in the image and computes the relative proportions, assigns a risk score and/or risk group to the image, and then returns the result to the workstation, possible along with a version of the image with a "heatmap" showing the different Gleason patterns in the image as determined by the Gleason grading model.

Figure 5B:
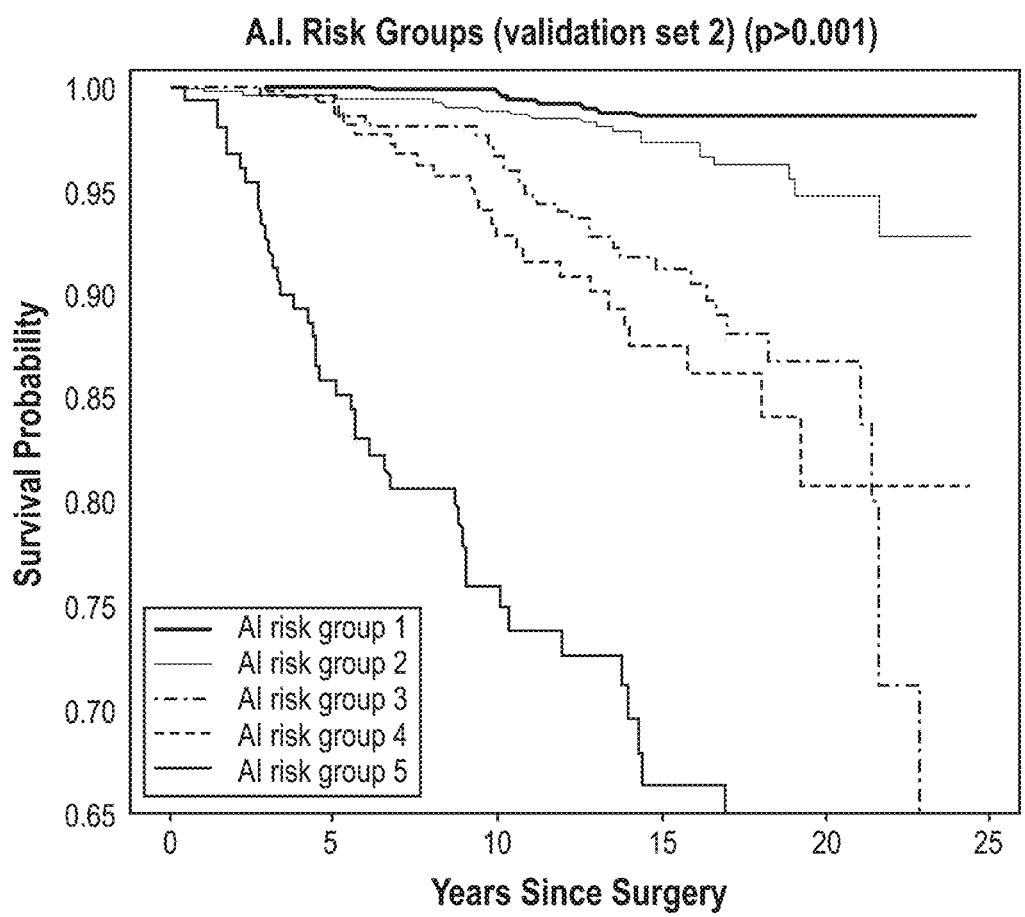
Figure 5C:
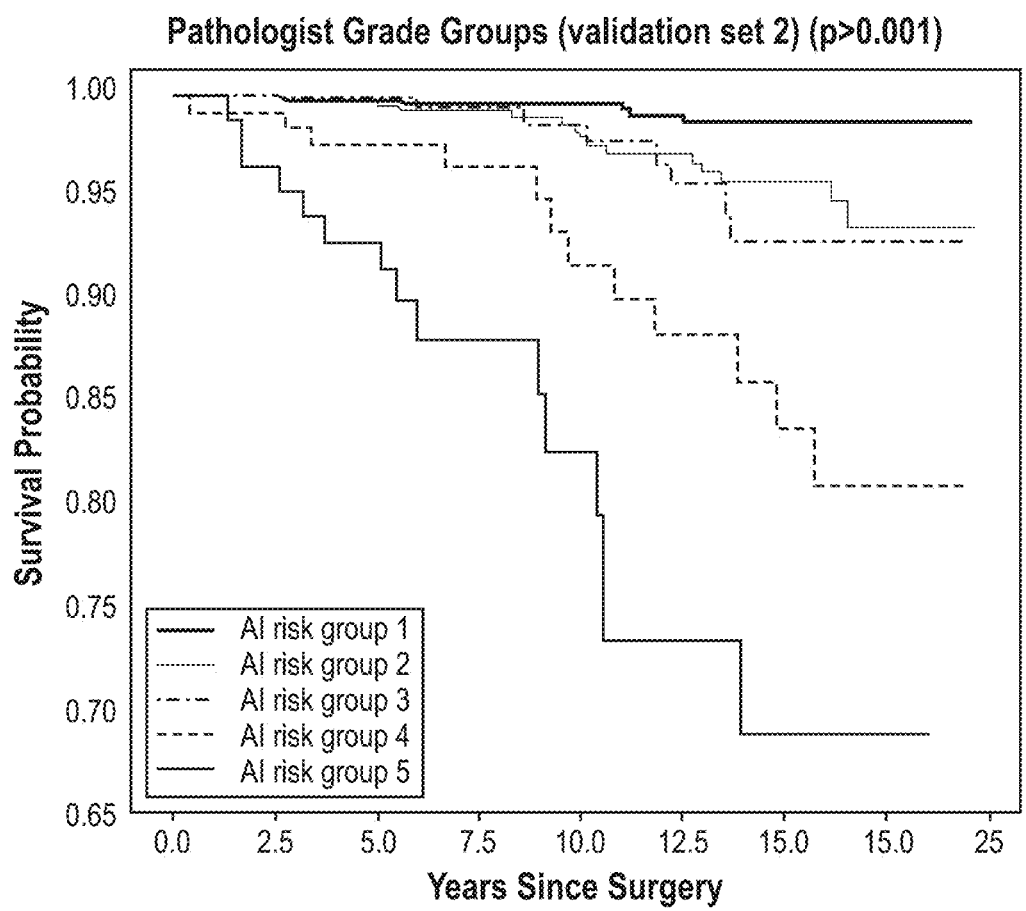
Figure 6A:
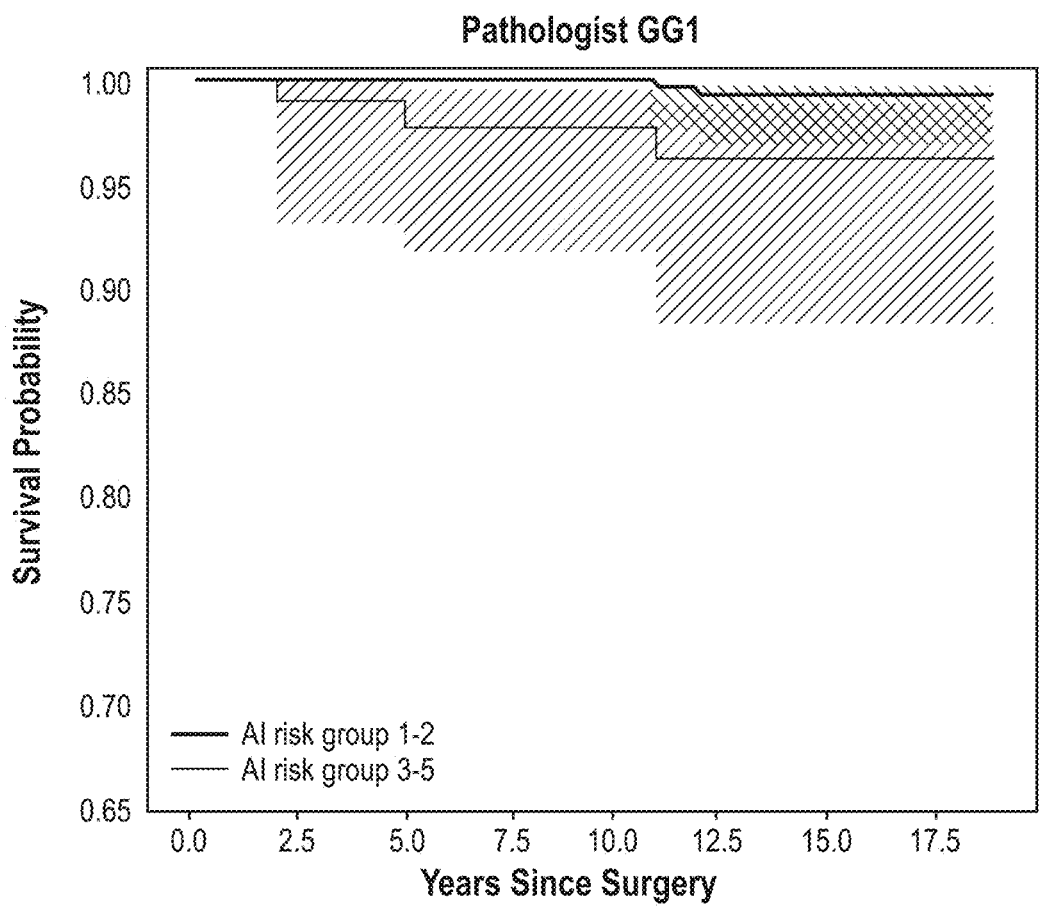
Figure 7A:
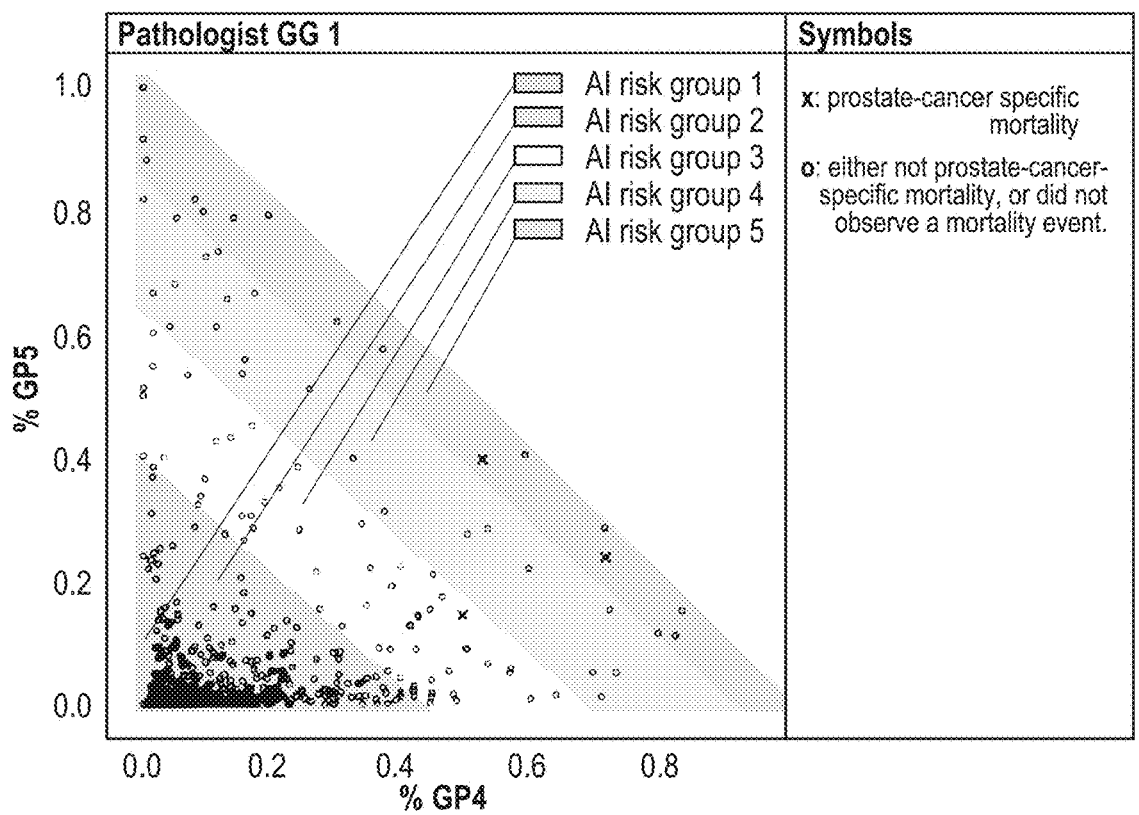
FIGS. 7A-7E are plots of percentage Gleason patterns 4 and 5 for different pathologist-determined Gleason Grades and showing the risk group definitions for such percentages.
Figure 7B:
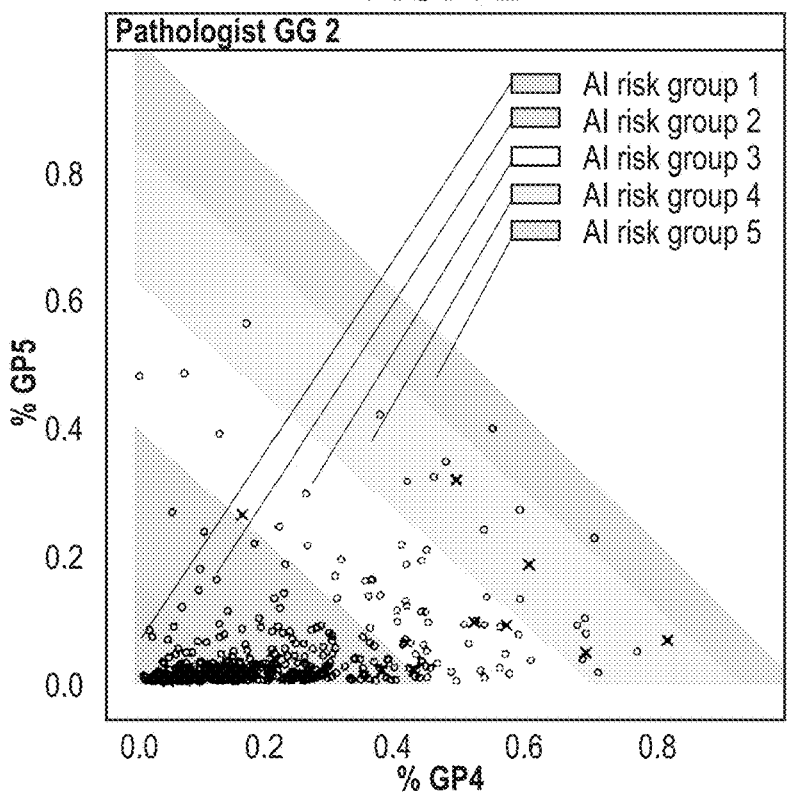
Figure 7C:
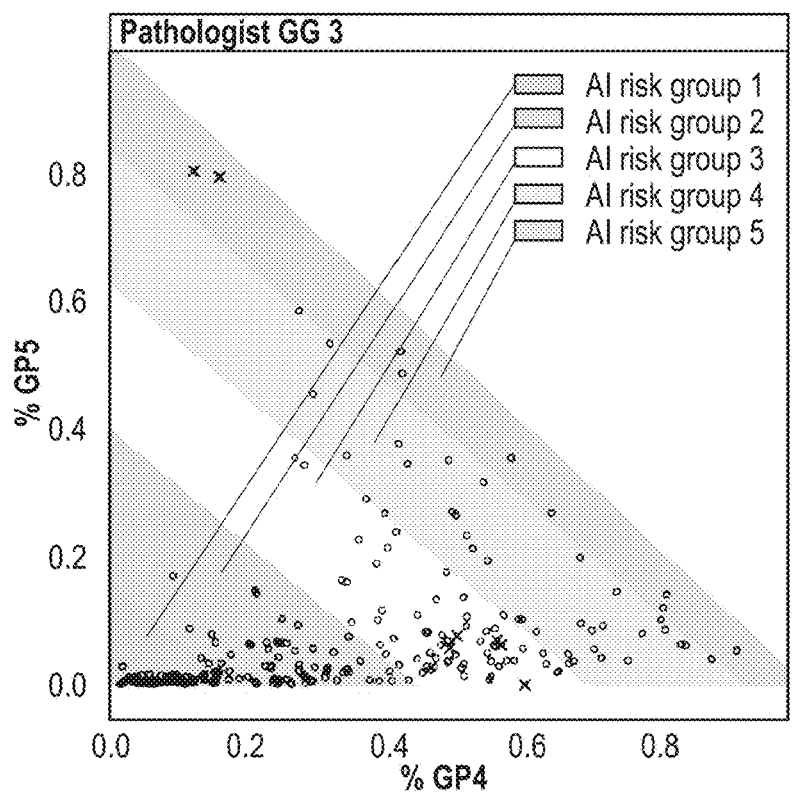
Figure 7D:
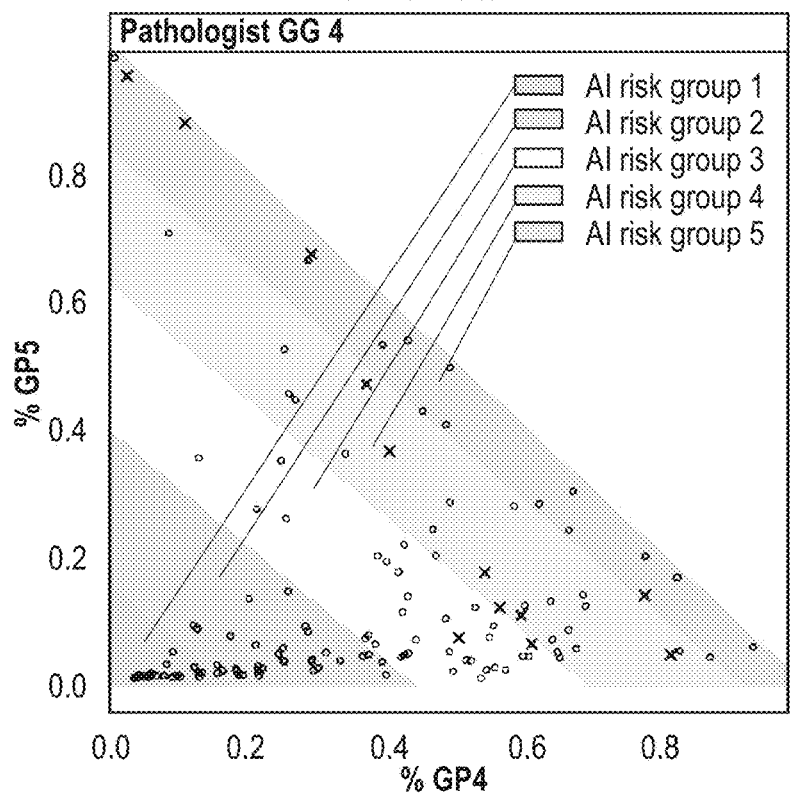
Figure 7E:
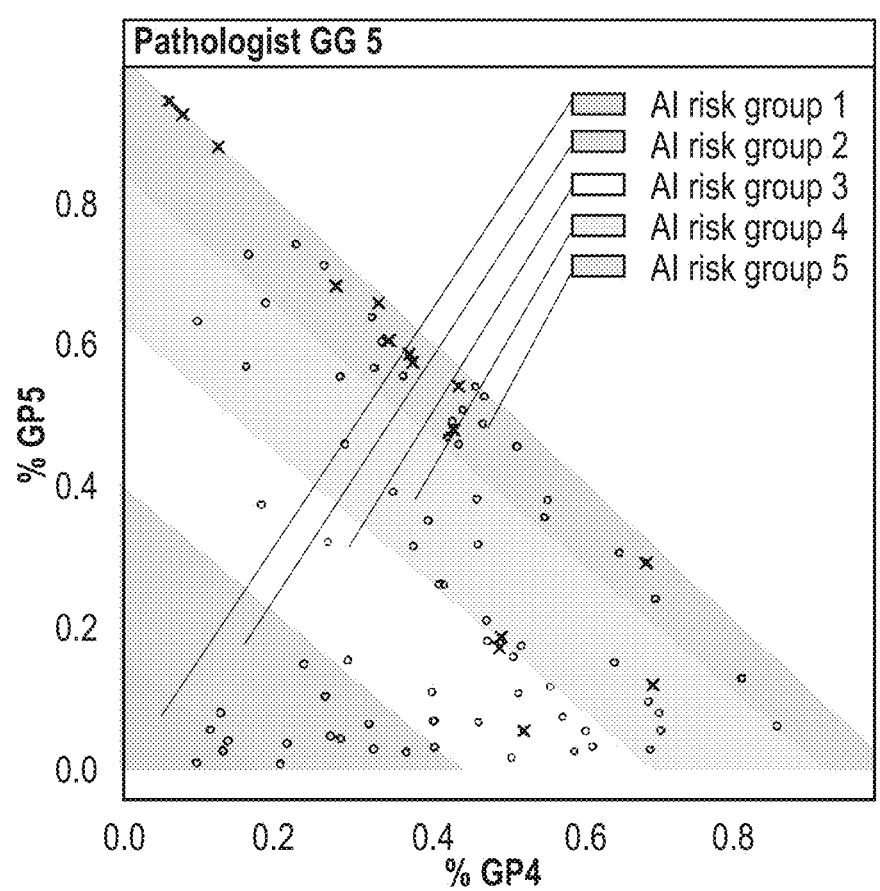

In still another aspect, a machine-readable memory is provided storing a procedure for calculating a risk group value or a risk group score associated with a prognosis of a prostate cancer patient from input in the form of relative proportions of the Gleason pattern scores assigned to a prostate tissue image by an artificial intelligence Gleason grading model trained to identify Gleason patters on a patch-by-patch basis in a prostate tissue image. This procedure can be in the form of a table, mathematical formula, or combination thereof, correlating a multitude of possible Gleason pattern score proportions (e.g., percentages) to one of a finite number of risk group values, such as five of such values, i.e., 1, 2, 3, 4, 5 corresponding approximately to Gleason Grade scores. The plots of FIGS. 5 and 6 demonstrate the correlation between risk group values and prognosis under the present inventive risk scoring paradigm.

In still another aspect, a system is provided for assessing the prognosis of a prostate cancer patient. The system includes a computer memory storing a digital image of a prostate specimen of the patient; and a programmed computer containing code for assigning Gleason pattern scores to regions of the image using an artificial intelligence Gleason grading model, the model trained to identify Gleason patterns on a patch-by-patch basis in a prostate tissue image; wherein the computer is further programmed with code to compute the relative proportions of the Gleason pattern scores; and wherein the computer is further programmed with a procedure for assigning a risk score or risk group value, or both, to the image using the relative proportions.

These illustrative examples are given to introduce the reader to the general subject matter discussed herein and the disclosure is not limited to this example. The following sections describe various additional non-limiting examples and examples of artificial intelligence prediction of prostate cancer outcomes.

Referring now to FIG. 1, FIG. 1 shows an example system that employs a trained deep learning system, referred to as Gleason Grading model 10 (or "model 10"). The model 10 in this example is a deep artificial neural network, though in other examples, it may be a pattern recognizer or any other suitable deep learning model. This example model 10 was developed using a development set 12 of images and associated ground truth. The model 10 has an ancillary or second model (not shown), e.g., a trained convolutional neural network or pattern recognizer, that is trained to distinguish between prostate tissue and non-prostate tissue to ensure that the Gleason Grading Model 10 only operates on those portions of an image that actually contain prostate tissue. However, it should be appreciated that the ancillary model may not be employed in some examples.

The details of the Gleason Grading Model 10 are illustrated in FIG. 8, and the associated discussion below. This model is trained from a development set of samples (magnified digital images of prostate specimens) with associated ground truth to make predictions of Gleason patterns (e.g., Gleason 1, 2, 3, 4, 5) on a patch-by patch basis. Once trained, the model 10 can then be used to make predictions 16 based on input digital images 14 of prostate specimens.

While the present methods make use of the model described above and shown in FIG. 8, it will be appreciated that other deep learning models that make Gleason pattern predictions on a patch by patch basis could be used and so the model described in this document is offered by way of example and not limitation.

Figure 9:
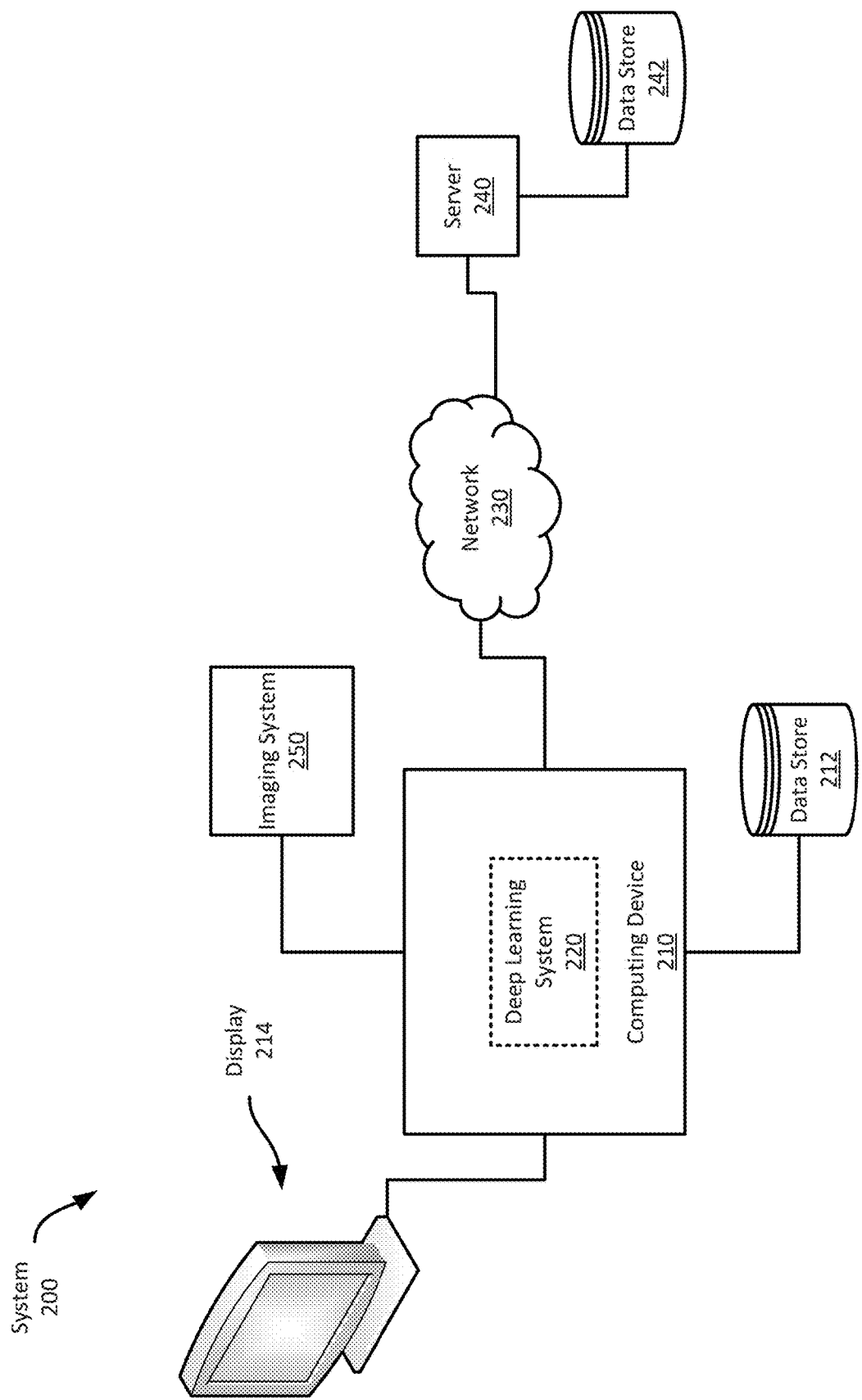
FIG. 9 illustrate an example system for AI prediction of prostate cancer outcomes.

Referring now to FIG. 9, FIG. 9 shows an example system 200 for AI prediction of prostate cancer outcomes. The example system 200 includes a computing device 210 that has access to a data store 212 and is connected to server 240 and its data store 242 via network 230. In this example, the computing device 210 is also connected to imaging system 250, which can capture and provide images of prostate tissue to the computing device 210. In addition, the computing device 210 can access digitized images of prostate tissue from data store 212 and provide them to the model 220 for analysis, such as using the system 10 described above with respect to FIG. 1. After completing the analysis, the model 220 provides the results to the computing device 210, stores them in data store 222 for later retrieval, e.g., by medical personnel, or displays them on the display 214, or any combination.

While in this example, the computing device 210 receives the images of prostate tissue from its own data store 212, in some examples, it may obtain images of prostate tissue from the server 240, which may access its own data store 242 to obtain and provide requested histopathology images. In some examples, the computing device 210 may be connected to a microscope that can capture images of prostate tissue. Further, while the analysis is performed by model 220 executed by the computing device 210 itself, in some examples, the model 220 may be part of the server 240, and the computing device 210 may provide images of prostate tissue to the server 240 for analysis, via network 230, and later receive the results, which may be stored in the data store 212 or displayed on the display 214.

In this example, the server 240 is maintained by a medical provider, e.g., a hospital or laboratory, while the computing device 210 is resident at a medical office, e.g., in a pathologist's office. Thus, such a system 200 may enable medical providers at remote locations to obtain predictions for prostate cancer outcomes, even if they lack the trained model 220. However, it should be appreciated that example systems according to this disclosure may only include computing device 210, which may perform the analysis itself without communicating with a remote computing device.

Figure 2:
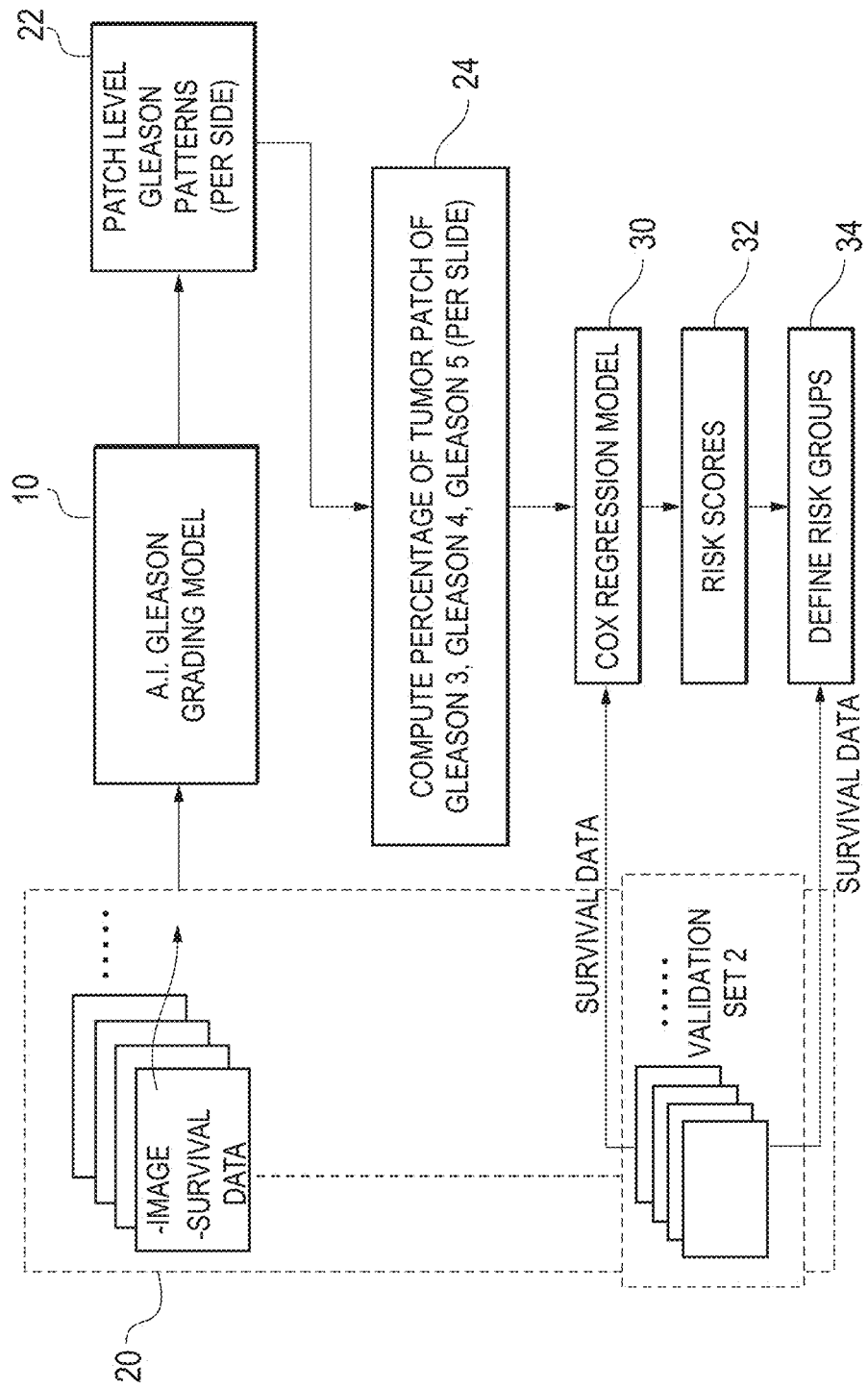
FIG. 2 is an illustration showing a method we used to generate our new AI risk score paradigm, including continuous risk scores and discrete risk groups, from (1) a set of samples (which included both image data and survival data for each go the samples), (2) the Gleason Grading Model of FIG. 1, and (3) a Cox proportional hazards regression model using the survival data and Gleason pattern patch predictions from the set.

Referring to FIG. 2, FIG. 2 is an illustration showing a processing flow for AI prediction of prostate cancer outcomes, including continuous risk scores and discrete risk groups, from a set of samples 20 (which included both image data and survival data for each of the samples), the model 10 of FIG. 1, and a Cox regression model 30 using the survival data and Gleason pattern patch predictions from the set 20.

The particulars of this set of samples 20 include both digital images of a prostate specimen and associated survival data for the patient providing the samples. In this example, the set 20 consisted of all archived slides in prostatectomy cases from 1995-2014 at the BioBank at the Medical University of Graz in Austria. The slides were scanned at magnification and digitized. There were typically several slides per case/patient. After excluding 9 cases for death within 30 days of the surgery, 2,811 cases remained. The median follow-up time was 13.1 years (interquartile range 8.5-17.2). This group of cases were grouped into two validations sets: all cases (validation set 1), and the subset of cases from 2000-2014 for which Gleason grading was performed at the time of pathologic diagnosis (n=1,517 cases, validation set 2), illustrated in Table 1, which provides the overall survival and disease-specific survival rates in each validation set.

TABLE 1

|  | Validation Set 1 | Validation Set 2 |
|---|---|---|
| Number of Cases | 2,815 | 1,517 |
| Number of Slides | 83,943 | 47,626 |
| Overall Survival | | |
| Median years of follow-up (interquartile range) | 13.1 (8.5, 17.2) | 11.2 (7.4, 15.2) |
| Censored | 2,152 | 1,306 |
| Observed | 663 | 211 |
| Disease-specific survival | | |
| Censored | 2,681 | 1,464 |
| Observed | 134 | 53 |
| Grade Group | | |
| 1 | 611 | 608 |
| 2 | 476 | 473 |
| 3 | 224 | 224 |
| 4 | 128 | 127 |
| 5 | 85 | 85 |
| Unknown | 1,291 | 0 |
| Pathologic T-stage | | |
| T1 | 22 | 3 |
| T2 | 1,626 | 1,110 |
| T3 | 791 | 366 |
| T4 | 25 | 8 |
| Unknown | 351 | 32 |
| Age at diagnosis | | |
| <60 | 955 | 537 |
| 60-65 | 925 | 501 |
| >65 | 935 | 479 |

In Table 1, validation set 1 contains all prostatectomy cases from the Biobank Graz between 1995-2014, while validation set 2 is a subset of validation set 1 and contains all prostatectomy cases between 2000-2014 where a diagnostic Grade Group was recorded.

As indicated at block 22, the images in the set 20 were input into the model 10 to assess the tumor composition and generate patch-level predictions of Gleason pattern on each of the images. The areal percentages were then determined at block 24 for three different Gleason patterns 3, 4 and 5 (% GP 3, % GP 4, % GP 5). In this example, the percentages were determined by determining the size of the patches of a given Gleason pattern (taking into account such things as pixel pitch, magnification, etc.) and dividing that size (area) by the total area of the tumor having Gleason patterns 3, 4 or 5. And while in this example, areal percentages were only computed for Gleason patterns 3, 4 and 5, any of the Gleason patterns 1-5 may be used in some examples. Further, it may be possible to determine all of the areal percentages for Gleason patterns by only computing percentages of some of the Gleason patterns, e.g., after determining the percent for Gleason patterns 4 and 5, the percentage for Gleason pattern 3 is one minus the combined percentage of Gleason patterns 4 and 5. For example, if the Gleason 4 areal percentage is computed as 0.5 (50 percent) and the Gleason 5 areal percentage is computed as 0.3 (30 percent) then the Gleason 3 percentage is 0.2 (20 percent), i.e., 1−(0.5+0.3)=0.2.

In one variation, it could instead determine the areal percent of the prostate tissue that is tumorous, and use that as additional or alternative input to the Cox regression model.

As indicated at 30, using the percentages computed at 24 and using the survival data from the set 20, the system fits a Cox proportional hazards regression model directly on these percentages, which in some examples may be augmented with the tumor percentage as explained above, to produce continuous AI risk scores 32, and use leave-one-out-cross-validation to adjust for optimism. The risk scores are a number between 0 to 1, with 0 being lowest risk, best prognosis, and 1 being highest risk, worst prognosis. The manner of calculation of the risk score is explained below. On validation set 1, this continuous risk score achieved a concordance index (C-index) of 0.83 (95% confidence interval (CI) 0.80-0.87) as shown in Table 2 below. In pre-specified primary analysis, on validation set 2, the C-index for the AI risk score (0.87) was significantly greater than for the pathologist GG (0.79), an improvement of 0.08 (95% CI 0.01-0.15).

TABLE 2

| | C-index [95% CI] | |
|---|---|---|
| | Validation Set 1 | Validation Set 2 |
| Pathologist Grade Groups | N/A | 0.79 [0.71, 0.86] |
| AI risk score (continuous) | 0.83 [0.80-0.87] | 0.87 [0.81, 0.91] |
| AI risk groups (discretized) | 0.82 [0.78-0.85] | 0.84 [0.79, 0.90] |

With respect to Table 2 above, the AI risk score is a continuous risk score from a Cox regression fit on Gleason pattern percentages from the AI. The AI risk group is a discretized version of the AI risk score. The discretization was done to match the number and frequency of pathologist Grade Groups in validation set 2. In validation set 2, the c-index for the AI risk score was statistically significantly higher than that for the pathologists' Grade Group ($p<0.05$, pre-specified analysis). With respect to the Pathologist Grade Groups for validation set 1, the data was not available because pathologist Grade Groups were not available for all cases in validation set 1 due to it being from an earlier time period.

As indicated at step 34 to additionally compare with pathologists' Gleason Grade Group (GG) categorizations, we also discretized these risk scores into "risk groups." These risk groups consist of numbers 1, 2, 3, 4 and 5, which matched or approximated the pathologist Grade Group (GG) distributions in terms of number of cases per risk group (see FIGS. 5A-5C and 6A-6E). Other paradigms for discretizing the continuous risk scores may be used according to other examples.

Referring to FIGS. 7A-7E, FIGS. 7A-7E shows a series of plots where the model 10 was used to categorize the two independent features (percent GP4 and GP5) as risk groups 1 through 5, for each pathologist-assigned Gleason Grade in the set of samples. The plots show that as the pathologist-assigned Gleason Grade increases, the relative proportion or percentage of Gleason patterns 4 and 5 in the images changes. As noted above, the Gleason pattern 3 percentage information can be extracted from these plots as the sum of the percentages of Gleason patterns 3, 4 and 5, which equal one.

The C-index for the discretized risk groups (0.85) also trended higher than for the pathologist GG, an improvement of 0.07 (95% CI 0.00-0.14) (see Table 2 above). Kaplan-Meier analyses also showed significant AI risk stratification in both validation sets ($p<0.001$ for log-rank test, see also FIG. 5), and multivariable regression models indicated a trend of increasing hazard ratio with both higher GG and higher risk group value shown in Table 3 below.

TABLE 3

| | Univariable | |
|---|---|---|
| | Hazard ratio [95% CI] | P-value |
| Grade Group | | |
| 1 | 1.0 (reference) | — |
| 2 | 3.85 [1.39, 10.70] | p = 0.010 |
| 3 | 4.68 [1.49, 14.76] | p = 0.009 |
| 4 | 14.30 [5.03, 40.62] | p < 0.001 |
| 5 | 35.87 [13.00, 98.97] | p < 0.001 |
| Grade Group | | |
| 1 | 1.0 (reference) | — |
| 2 | 0.71 [0.17, 2.97] | p = 0.641 |
| 3 | 6.23 [2.19, 17.69] | p < 0.001 |
| 4 | 13.16 [4.74, 36.54] | p < 0.001 |
| 5 | 35.54 [13.26, 95.27] | p < 0.001 |

In some cases, there may be discordances between the risk groups and pathologist GG. First, we compared 10-year disease-specific survival rates for cases where the risk group was higher or lower risk than the pathologist GG, shown in Table 4 below. Within each pathologist-determined GG, the 10-year survival rates were higher for cases where the AI provided a lower risk classification, especially for GG≥3. The survival rates also tended to be lower where the AI provided a higher risk classification. Second, risk stratification by the risk groups 1-2 vs. 3-5 remained significant within each pathologist-determined GG (see the plots of FIG. 6). In particular, among the GG 3-5 patients, a sizable subgroup (182 of 436, 42%) were assigned AI risk groups of 1-2 and these patients did not experience any disease-specific mortality events, as shown in Table 4 and in FIGS. 6A-6E.

TABLE 4

| Pathologist Grade Group | | AI risk group | | |
|---|---|---|---|---|
| | All | Lower | Same | Higher |
| 1 | 1.00 [0.99, 1.00] n = 608 | N/A | 1.00 [1.00, 1.00] n = 327 | 0.99 [0.97, 1.00] n = 281 |
| 2 | 0.98 [0.96, 0.99] n = 473 | 1.00 [1.00, 1.00] n = 212 | 0.98 [0.94, 1.00] n = 179 | 0.93 [0.84, 0.97] n = 82 |
| 3 | 0.99 [0.95, 1.00] n = 224 | 1.00 [1.00, 1.00] n = 117 | 0.98 [0.87, 1.00] n = 56 | 0.97 [0.81, 1.00] n = 51 |
| 4 | 0.92 [0.83, 0.96] n = 127 | 1.00 [1.00, 1.00] n = 83 | 0.81 [0.56, 0.93] n = 26 | 0.72 [0.33, 0.91] n = 18 |
| 5 | 0.83 [0.70, 0.90] n = 85 | 0.93 [0.74, 0.98] n = 53 | 0.65 [0.42, 0.81] n = 32 | N/A |

It will be appreciated that after the development work of FIG. 2 has been performed and the risk score and risk group definitions determined, such definitions are then stored in memory, e.g., as a table or mathematical formula, or combination thereof so that they can be used in the future for generating a risk score or risk group value for a particular prostate tissue sample. For the present work, we have used Equation 1 to calculate the risk score:

$$\text{risk score} = (\log(HR\_GP4) * \%GP4 + \log(HR\_GP5) * \%GP5))/(100 * \log(HR\_GP5)) \quad \text{Eq. 1:}$$

The Hazard Ratios (HR) for Gleason patterns 4 and 5 are fit by a Cox Regression model. The specific Hazard Ratios fit by the model can be seen in FIGS. 5A-5C, and these values may vary depending on the size, composition and clinical characteristics of the members of the development set 20. In one specific embodiment, the risk score is calculated from the percent Gleason patterns according to Equation 2:

$$\text{risk score} = 0.0975 * \%GP4 + 0.10 * \%GP5 \quad \text{Eq. 2.}$$

The range for risk scores that correspond to the risk groups in one specific embodiment of our scoring paradigm are as shown in Table 5:

TABLE 5

| Risk Group | Risk Scores |
|---|---|
| 1 | 0.000-0.167 |
| 2 | 0.168-0.447 |
| 3 | 0.448-0.698 |
| 4 | 0.699-0.881 |
| 5 | 0.882-1.000 |

Figure 3:
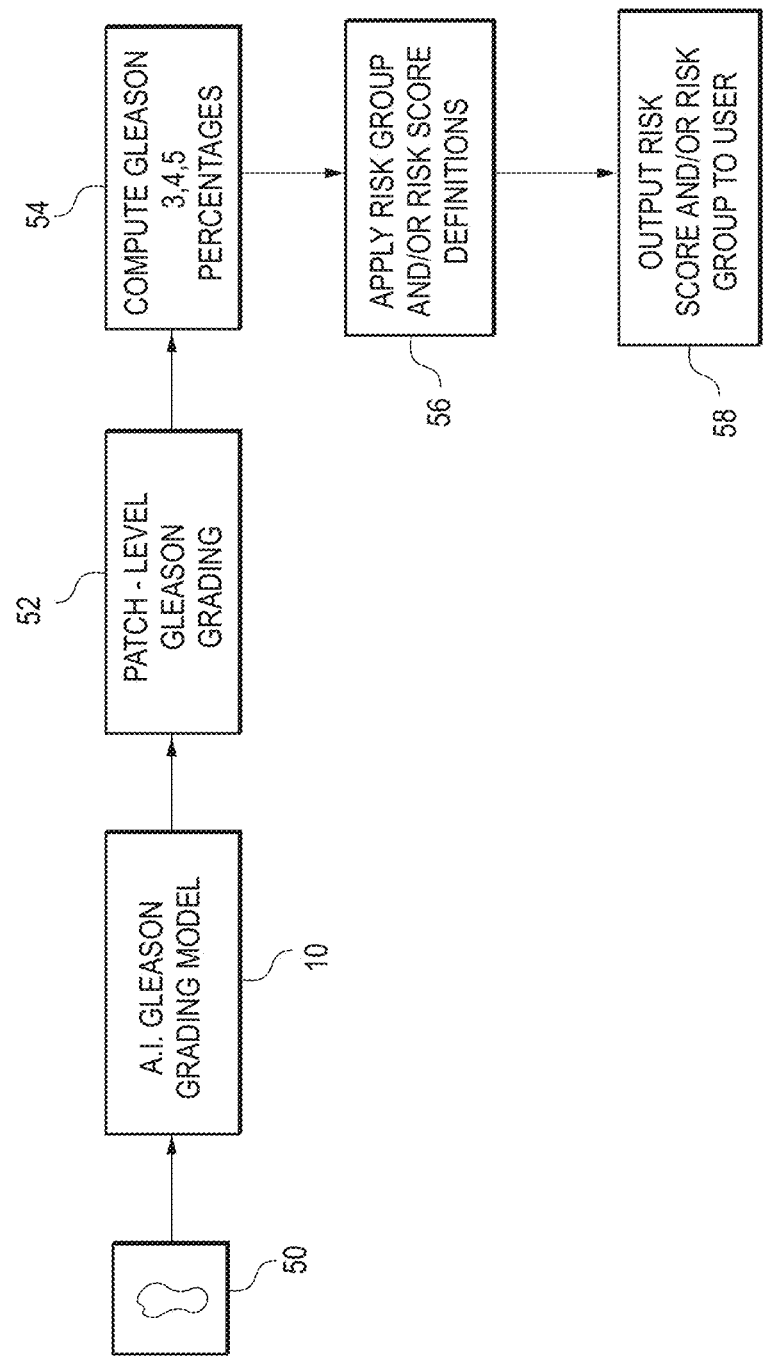
FIG. 3 is a flow chart showing a method of generating a risk group value or risk score for a prostate cancer tissue specimen image. This risk group value or score could be implemented as a stand-alone prediction, as a second read (e.g., as an adjunct to an overall Gleason Grade assigned by a pathologist) or as a combined manner in which the risk group score is combined with the pathologist's overall Gleason Grade assignment.

In practice, the above Equation (1), or Equation (2) and a table storing the values above in Table 5, or equivalently, a code procedure, are stored in computer memory and used to generate the risk score and/or risk group value for a given slide in the procedure of FIG. 3 from the computation of the areal percentages of Gleason patterns 4 and 5 (% GP4 and % GP5 in Equations 1 and 2).

Referring now to FIG. 3, FIG. 3 is an illustration of an example workflow for generating a risk score or risk group value for a digital image 50 of a prostate sample at the time of use. The sample is imaged, e.g., by a whole slide scanner at a given magnification, such as 40×, and the image 50 is input to the AI Gleason Grading Model 10 of FIGS. 1 and 2. In this example, the Model 10 first determines prostate tissue/non-tissue regions of the image and then, for the tissue portion, predicts the Gleason patterns 3, 4, and 5 for the tumor areas of the slide, indicated at block 52. The percentages of Gleason patterns 3, 4 and 5 are then determined as indicated at block 54. At block 56, the risk score and/or risk group definitions are then applied to the percentages determined at block 54 resulting in the generation of a risk score and/or risk group value assignment for the image. At block 58 the risk score and/or risk group value assignment is then presented to the user, e.g., via a workstation 100 having a display 102, an example of which is shown in FIG. 4. The specimen image 50 is presented to the user, along with the percentages of Gleason pattern 3, 4 and 5 (represented by the numbers X1, X2 and X3) and along with a risk score (in this example 0.7 on a scale of between 0 and 1, with 0 being lowest risk, good prognosis and 1 being highest risk, worse prognosis) and/or the risk group value, here the value "4."

The methodology of FIGS. 3 and 4 can function as an automated, standalone method for prediction of prostate cancer outcomes. We have demonstrated the utility of this method, see the Appendix and the Kaplan-Meier plots of FIGS. 5A-5C and Table 2, rows 3 and 4 above.

The methodology of FIGS. 3 and 4 can also function as a second read. As one possible example of this, the "user" of the workstation 100 in this embodiment could be a patholo-gist. For example, the pathologist may be presented with a dialog box on the workstation display to input their own assessment of the image, e.g., Gleason Grade 3, and the display presents the AI risk group value, e.g. "4." The pathologist, seeing this discrepancy, may be prompted to reassess the image and reconsider their Gleason Grade assignment to the image. In this situation, the presentation of the risk score and/or risk group functions as a second read. The utility of this methodology is demonstrated in the Kaplan-Meier plots of FIGS. 6A-6E and Table 2 above.

The pathologist-determined Gleason Grade and the AI risk score and/or risk group value can be combined in an ensemble manner in yet another further possible implementation. The utility of this approach is demonstrated in the last row of Table 6 below. The pathologist Gleason Grade and AI risk group value numbers can be combined in several fashions, such as by simple averaging, or using a weighting of the two numbers to reflect relative confidence in the predictions of the AI system and the confidence of the pathologist in their Gleason Grade assignment.

TABLE 6

| Year of Analysis | 1995-2014 | 2000-2014 |
|---|---|---|
| No. of Cases | 2,815 | 1,517 |
| A) Pathologist Grade Group | 0.79 [0.71, 0.85] | 0.79 [0.71, 0.85] |
| B) AI risk score | 0.86 [0.81, 0.89] | 0.86 [0.81, 0.89] |
| C) AI risk group | 0.85 [0.79, 0.90] | 0.85 [0.79, 0.90] |
| D) Combined risk group | 0.86 [0.80, 0.90] | 0.86 [0.80, 0.90] |

In addition, some examples can employ an "ensembling" approach by determining the arithmetic mean of the AI risk group and pathologist-provided GG, resulting in a C-index of 0.86 (95% CI 0.80-91) vs. 0.79 for pathologists and 0.85 for the AI risk groups, shown in Table 6 above. A qualitative analysis of algorithm and pathologist discordances suggests several ways in which the algorithmic grading and pathologist grading may be complementary, including consistent grading of regions by the AI which may be variably over-graded by pathologists, or identification of small, high grade regions which may otherwise be missed by pathologists, such as shown in FIG. 6E.

Another example involves presenting the AI risk group value or risk score to an oncologist treating a prostate cancer patient. The oncologist could be presented with either or both the AI risk group value assignment or risk score, along with the pathologist Gleason Grade assignment. The oncologist could then guide the treatment of the patient using both pieces of information, for example to recommend earlier, more aggressive, treatment of the cancer or conversely to initiate a watchful waiting regime, for example where both the AI risk group value or risk score and the pathologist Gleason Grade for the image are low.

Referring now to FIG. 8, FIG. 8 shows an example configuration of the Gleason Grade Model 10 of FIG. 1. The model includes of two stages: a convolutional neural network (CNN) 1100 that classifies image patches within each slide by Gleason pattern (1, 2, 3, 4 or 5). These predictions can be converted into a predictions heatmap 1102 from which the color-coded Gleason score overlays are generated in a viewer on a workstation, for example as explained in our prior patent application. In the configuration shown in FIG. 8, this convolutional neural network 1100 is followed by a second machine learning model 1104 (in one implementation, a support vector machine, or SVM) that uses features extracted from the resulting heatmap 1102 to classify the biopsy/slide's overall Grade Group (GG). However, this second model 1104 may be omitted in some examples. Further, some examples could be augmented with a first machine learning model (e.g., deep CNN) that is trained to distinguish prostate tissue from non-prostate tissue, such that the CNN 1100 only operates on prostate tissue. For example, some slides from a prostatectomy "specimen" may also contain non-prostate tissue such as seminal vesicles. It is undesirable if the Gleason model 10 generates "false" Gleason pattern predictions on these non-prostate tissue types.

For example, to collect data for model development, pathologists were asked to coarsely outline extraprostatic tissue and seminal vesicle regions across 221 slides from The Cancer Genome Atlas and previously digitized slides from the Navy Medical Center San Diego. Extraprostatic tissue and seminal vesicle annotations were combined into one 'Extraprostatic Tissue' class. An additional 150 slides were randomly sampled from the Gleason grading dataset (see "Gleason Grading Model" in the Methods), and any benign or Gleason pattern 3, 4, or 5 annotation was considered to be part of the 'Prostatic Tissue' class.

The resulting 371 slides were randomly split into a training and tuning split. A convolutional neural network, using the same architecture, training methodology, and hyperparameter tuning methodology described for the Gleason Grading model, was trained for the binary 'Extraprostatic Tissue' vs. 'Prostatic Tissue' task, with a resulting AUC of 0.99 on the tuning set. The threshold for binarization was chosen to achieve 97% precision (at 84% recall) of prostatic tissue.

Suitable architectures for Gleason grading prostatectomy specimens may be based on a classic "Inception" neural network architecture, Nagpal, K. et al. *Development and validation of a deep learning algorithm for improving Gleason scoring of prostate cancer*. NPJ Digit Med 2, 48 (2019), or a second for Gleason grading biopsy specimens based on a customized neural network architecture. Nagpal, K. et al. *Development and Validation of a Deep Learning Algorithm for Gleason Grading of Prostate Cancer From Biopsy Specimens*. JAMA Oncol (2020). To train these models, a prostatectomy dataset from an initial study was used to train a new model using the customized neural network architecture introduced in the second study, such as shown in FIG. 8. The training dataset contained 112 million pathologist-annotated "image patches" from a completely independent set of prostatectomy cases from the validation data used in this study. Briefly, the system takes as input 512×512 pixel image patches (at 10× magnification, 1 µm per pixel) and classifies each patch as one of four categories: non-tumor, Gleason pattern 3, 4, or 5. The hyperparameters used for training this network were determined using a random grid search over fifty potential settings and shown in Table 7 below.

TABLE 7

| | Gleason Grading Model | Prostatic Tumor Segmentation |
|---|---|---|
| Architecture | Custom TuNAS Architecture | |
| | L2 Weight Decay: 0.004 | |
| Color perturbations | Saturation delta: 0.80 | |
| | Brightness delta: 0.96 | |
| | Contrast delta: 0.17 | |
| | Hue delta: 0.02 | |
| Learning rate schedule | Exponential decay schedule | Exponential decay schedule |
| | Base rate: 0.0042 | Base rate: 0.0001 |

TABLE 7-continued

| | Gleason Grading Model | Prostatic Tumor Segmentation |
|---|---|---|
| | Decay rate: 0.95 | Decay rate: 0.90 |
| | Decay steps: 51,733 steps | Decay steps: 25,000 steps |
| RMSProp optimizer | Decay: 0.95 | Decay: 0.95 |
| | Momentum: 0.7 | Momentum: 0.7 |
| | Epsilon: 0.001 | Epsilon: 0.001 |
| Other | Image input magnification: 10X (1 µm/pixel) | Image input magnification: 5X (2 µm/pixel) |
| | Loss function: softmax cross-entropy | Loss function: softmax cross-entropy |
| | Batch size: 32 | Batch size: 16 |

All available slides for archived prostate cancer resection cases between 1995 and 2014 in the BioBank Graz at the Medical University of Graz were retrieved, de-identified, and scanned using a Leica Aperio AT2 scanner at 40× magnification (0.25 µm/pixel). Gleason scores were extracted from the original pathology reports, along with pathologic TNM staging, and patient age at diagnosis. Disease-specific survival (DSS) was inferred from International Classification of Diseases (ICD) codes from the Statistik Austria database. Codes considered for prostate-cancer related death were C61 and C68. Institutional Review Board approval for this retrospective study using de-identified slides and associated pathologic and clinical data was obtained from the Medical University of Graz (Protocol no. 32-026 ex 19/20).

Validation set 1 included all available cases from 1995-2014 as discussed above. Because Gleason scoring at the Medical University of Graz was adopted in routine practice from 2000 onwards, validation set 2 included all cases from 2000 onwards for which a Gleason score was available. Sensitivity analysis for inclusion of Gleason grades prior to the year 2000 (before Gleason scoring became routine at the institution) is presented in Table 8 below.

TABLE 8

| Year of Analysis | 2000-2014 | 1995-2014 |
|---|---|---|
| No. of Cases | 1,517 | 1,524 |
| A) Pathologist Grade Group | 0.79 [0.71, 0.86] | 0.78 [0.71, 0.85] |
| B) AI risk score | 0.86 [0.81, 0.91] | 0.86 [0.81, 0.91] |
| C) AI risk group | 0.85 [0.79, 0.90] | 0.85 [0.80, 0.90] |

All slides underwent manual review by 21 pathologists to confirm stain type and tissue type. Briefly, immunohistochemically stained slides were excluded from analysis and only slides containing primarily prostatic tissue were included. Slides containing exclusively prostatic tissue were included in their entirety. Slides with both prostatic tissue and seminal vesicle tissue were included, but processed using a prostatic tissue model meant to provide only prostatic tissue to the Gleason grading model. All other slides were excluded from analysis.

The Gleason grading model was run at stride 256 (at 10× magnification, 1 µm per pixel) on all prostate tissue patches. The classification of each patch as non-tumor or GP 3, 4, or 5 was determined via argmax on re-weighted predicted class probabilities. For each case, the percentage of prostate tumor patches that belong to Gleason patterns 3, 4 and 5 were subsequently computed. AI risk scores were computed by fitting a Cox regression model using these case-level Gleason pattern percentages as input, and the right-censored outcomes as the events. This approach was pursued first (rather than direct mapping of % Gleason Patterns (GPs) to GG as done by pathologists) due to the prognostic importance of precise Gleason pattern quantitation, as well as the exhaustive nature of AI grading that rarely leads to classifications of GG1 (e.g., 100% GP3) and GG4 (e.g., 100% GP4). Sensitivity analyses evaluating additional ways of obtaining risk groups from % GPs, including direct mapping of % GPs to GG and a temporal-split methodology, demonstrated qualitatively similar results and are presented in Table 9 below.

TABLE 9

|  | C-index [95% CI] | |
| --- | --- | --- |
|  | Validation Set 1 | Validation Set 2 |
| A) LOOCV | 0.82 [0.78, 085] | 0.85 [0.79, 0.90] |
| B) Temporal Split | N/A | 0.85 [0.80, 0.90] |
| C) Rule-based | 0.80 [0.76, 0.83] | 0.84 [0.78, 0.88] |

Gleason pattern 3 percentage was dropped as an input feature to avoid linear dependence between features. Leave-one-case-out cross-validation was used to adjust for optimism, similar to the 10-fold cross validation used in Epstein et al. AI risk groups were derived from the AI risk scores by discretizing the AI risk scores to match the number and frequency of pathologist GG in validation set 2.

Primary and secondary analyses were pre-specified and documented prior to evaluation on the validation sets. The primary analysis consisted of the comparison of Concordance (C)-indices for DSS between pathologist GG and the AI risk scores, shown in Table 4. The secondary analysis consisted of the comparison between C-indices for pathologist GG and the discretized AI risk groups. All other analyses were exploratory.

The prognostic performance of the pathologist GG, the AI risk scores and the AI risk group values were measured using Harrel's C-index, a generalization of area under the receiver operating characteristic curve (AUC) for time-censored data. Confidence intervals for both the C-index of AI and pathologists, and the differences between them, were computed via bootstrap resampling with 1000 samples.

In Kaplan-Meier analysis of the pathologist GG and AI risk groups, the multivariate log-rank test was used to test for differences in survival curves across groups. All survival analysis were conducted using the Lifelines python package39 (version 0.25.4).

Figure 10:
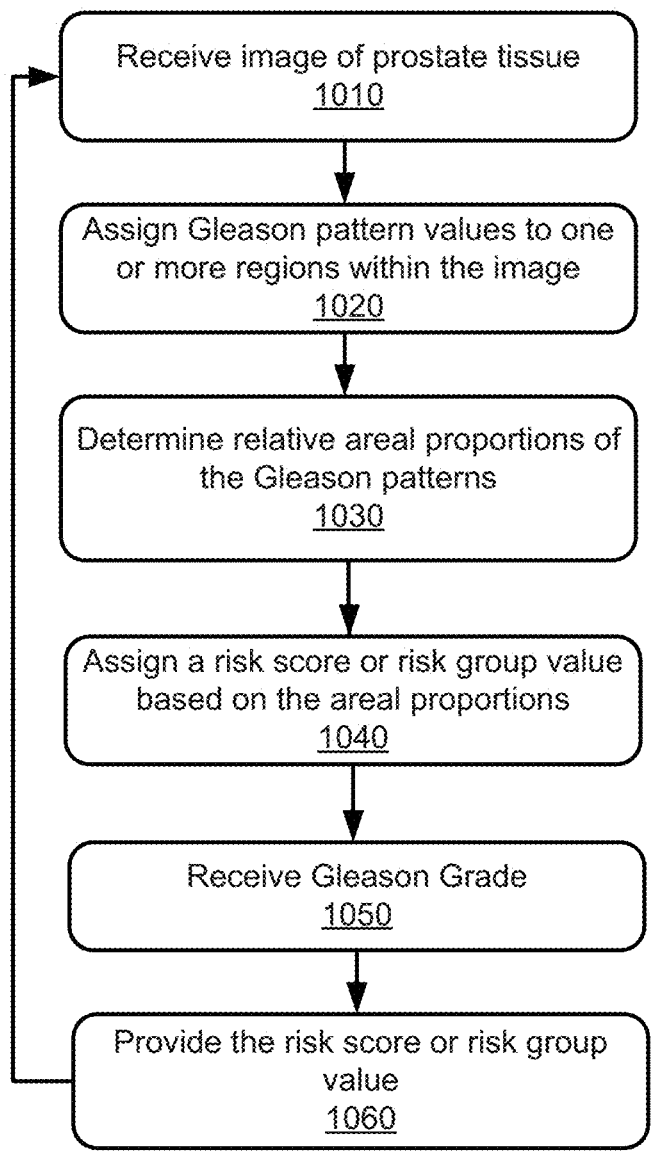
FIG. 10 illustrates an example method for AI prediction of prostate cancer outcomes.

Referring now to FIG. 10, FIG. 10 shows an example method 1000 for AI prediction of prostate cancer outcomes. The example will be discussed with respect to the system 200 shown in FIG. 9 and the model 10 shown in FIG. 1; however, any suitable system according to this disclosure may be employed.

At block 1010, the computing device 210 obtains an images of prostate tissue. In this example, the computing device 210 obtains the images from its data store 212; however, in some examples, it may obtain the images from an imaging system 250 or from a remote server 240 or data store 242.

At block 1020, the model 10 assigns Gleason patterns values to one or more regions within the image. In this example, the model assigns Gleason values of 3, 4, and 5 for the tumor areas of the slide, as discussed above with respect to FIG. 3. In some examples, the model 10 may first determine prostate tissue versus non-prostate tissue regions of the image, which may ensure that the model 10 only determines predictions for prostate tissue.

At block 1030, the computing device 210 determines relative areal proportions of the Gleason patterns, generally as discussed above with respect to block 24 of FIG. 2.

At block 1040, the computing device 210 determines a risk score or risk group value based on the areal proportions, generally as discussed above with respect to blocks 30 of FIG. 2 or 56 of FIG. 3, which may involve the use of a Cox proportional hazard regression model fitted to a set of Gleason patterns or proportions thereof assigned to a multitude of images in a data set by the artificial intelligence Gleason grading model and associated survival data associated with the data set.

At block 1050, the computing device 210 receives a Gleason Grade corresponding to the image from a user of the computing device 210. For example, the user may be prompted to provide a Gleason Grade. The user-provided Gleason Grade may be combined with the determined risk score or risk group value, generally as discussed above with respect to FIGS. 3 and 4. It should be appreciated that the functionality of block 1050 may be omitted in some examples.

At block 1060, the risk score or risk group value is provided. For example, the risk score or risk group value (or both, in some examples), may be displayed on display 214, stored in data store 212, stored in data store 242, or otherwise communicated to a pathologist, oncologist, or other medical professional. In some examples, a combined risk score or risk group value may be provided, such as may be generated at block 1050 in some examples.

Figure 11:
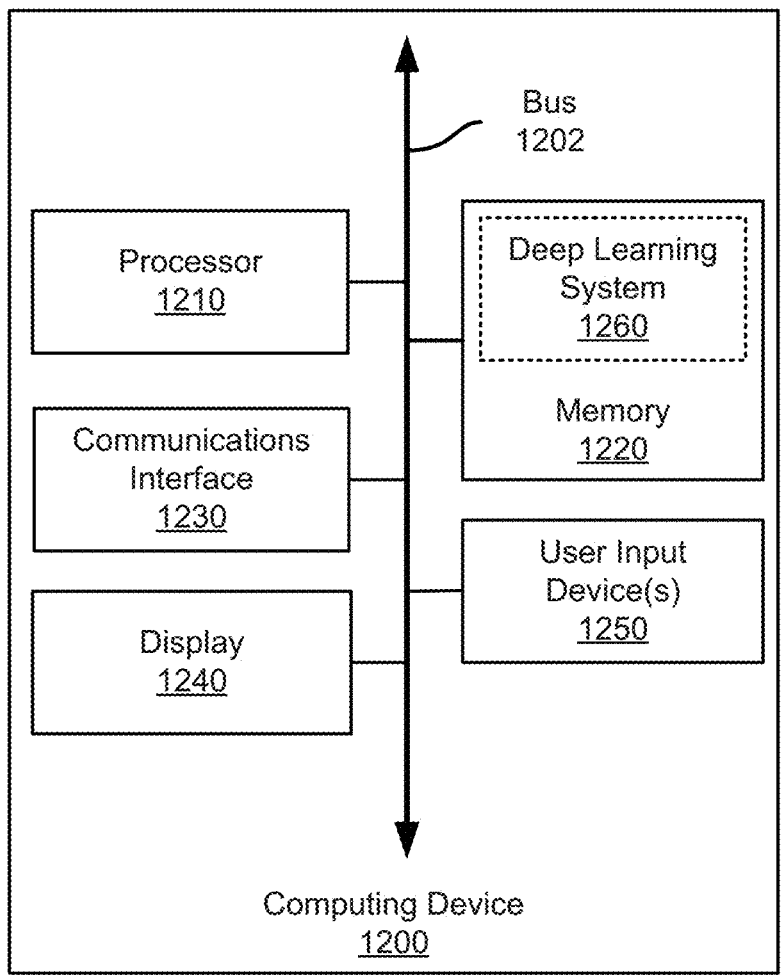
FIG. 11 illustrates an example computing device suitable for use with example systems and methods for AI prediction of prostate cancer outcomes.

Referring now to FIG. 11, FIG. 11 shows an example computing device 1200 suitable for use in example systems or methods for AI prediction of prostate cancer outcomes according to this disclosure. The example computing device 1200 includes a processor 1210 which is in communication with the memory 1220 and other components of the computing device 1200 using one or more communications buses 1202. The processor 1210 is configured to execute processor-executable instructions stored in the memory 1220 to perform one or more methods for AI prediction of prostate cancer outcomes according to different examples, such as part or all of the example method 1000 described above with respect to FIG. 10. In this example, the memory 1220 includes a deep learning system 1260, such as the example model 10 shown in FIG. 1, 2, or 8. In addition, the computing device 1200 also includes one or more user input devices 1250, such as a keyboard, mouse, touchscreen, microphone, etc., to accept user input; however, in some examples, the computing device 1200 may lack such user input devices, such as remote servers or cloud servers. The computing device 1200 also includes a display 1240 to provide visual output to a user. However, it should be appreciated that user input devices or displays may be optional in some examples.

The computing device 1200 also includes a communications interface 1240. In some examples, the communications interface 1230 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A computer-implemented method of assessing a prognosis of a prostate cancer patient, comprising the steps of:
    receiving an image of prostate tissue;
    assigning Gleason pattern values to one or more regions within the image using an artificial intelligence Gleason grading model, the model trained to identify Gleason patterns on a patch-by-patch basis in a prostate tissue image;
    determining relative areal proportions of the Gleason patterns within the image;
    generating a continuous risk score for the entire image based on the determined relative areal proportions;
    assigning at least one of the continuous risk score or risk group value, the risk group value based on the continuous risk score; and
    outputting at least one of the continuous risk score or the risk group value.

2. The method of claim 1, wherein the assigning at least one of the continuous risk score or the risk group value comprises using a Cox proportional hazard regression model fitted to a set of Gleason patterns or proportions thereof assigned to a multitude of images in a data set by the artificial intelligence Gleason grading model and associated survival data associated with the data set.

3. The method of claim 1, wherein the image of the prostate tissue comprises an image of a specimen obtained from a prostatectomy or a needle core biopsy.

4. The method of claim 1, further comprising presenting at least one of the risk score or the risk group value on a display of a workstation.

5. The method of claim 4, further comprising receiving a Gleason Grade for the image from the workstation.

6. The method of claim 5, further comprising combining the risk group value with a Gleason Grade.

7. The method of claim 6, wherein combining the risk group value with the Gleason Grade comprises determining an average of the risk group value and the Gleason Grade.

8. The method of claim 1, wherein the risk group values comprise integers from 1 to 5, inclusive, and wherein a survival probability of each of the risk group values approximately correspond to a survival probability of prostate cancer patients having Gleason Grades of integers 1-5 inclusive, respectively.

9. The method of claim 1, further comprising using a model trained to distinguish prostate tissue from non-prostate tissue, wherein receiving the image comprises receiving only prostate tissue regions of the image from the model.

10. A system for assessing a prognosis of a prostate cancer patient, comprising:
    a non-transitory computer-readable medium; and
    one or more processors communicatively coupled to the non-transitory computer-readable medium, the one or more processors configured to execute processor-executable instructions stored in the non-transitory computer-readable medium to:
        receive an image of prostate tissue;
        assign Gleason pattern values to one or more regions within the image using an artificial intelligence Gleason grading model, the model trained to identify Gleason patterns on a patch-by-patch basis in a prostate tissue image;
        determine relative areal proportions of the Gleason patterns within the image;

generate a continuous risk score for the entire image based on the determined relative areal proportions;

assign at least one of the continuous risk score or risk group value, the risk group value based on the continuous risk score; and output at least one of the risk score or the risk group value.

11. The system of claim 10, wherein the one or more processors are configured to execute further processor-executable instructions stored in the non-transitory computer-readable medium to use a Cox proportional hazard regression model fitted to a set of Gleason patterns or proportions thereof assigned to a multitude of images in a data set by the artificial intelligence Gleason grading model and associated survival data associated with the data set.

12. The system of claim 10, wherein the image of the prostate tissue comprises an image of a specimen obtained from a prostatectomy or a needle core biopsy.

13. The system of claim 10, wherein the one or more processors are configured to execute further processor-executable instructions stored in the non-transitory computer-readable medium to present at least one of the risk score or the risk group value on a display of a workstation.

14. The system of claim 13, wherein the one or more processors are configured to execute further processor-executable instructions stored in the non-transitory computer-readable medium to receive a Gleason Grade for the image from the workstation.

15. The system of claim 14, wherein the one or more processors are configured to execute further processor-executable instructions stored in the non-transitory computer-readable medium to combine the risk group value with a Gleason Grade.

16. The system of claim 15, wherein the one or more processors are configured to execute further processor-executable instructions stored in the non-transitory computer-readable medium to determine an average of the risk group value and the Gleason Grade.

17. The system of claim 10, wherein the risk group values comprise integers from 1 to 5, inclusive, and wherein a survival probability of each of the risk group values approximately corresponds to a survival probability of prostate cancer patients having Gleason Grades of integers 1-5 inclusive, respectively.

18. The system of claim 10, wherein the one or more processors are configured to execute further processor-executable instructions stored in the non-transitory computer-readable medium to use a model trained to distinguish prostate tissue from non-prostate tissue, wherein receiving the image comprises receiving only prostate tissue regions of the image from the model.

19. A non-transitory computer-readable medium comprising processor-executable instructions configured to cause one or more processors to:

receive an image of prostate tissue;

assign Gleason pattern values to one or more regions within the image using an artificial intelligence Gleason grading model, the model trained to identify Gleason patterns on a patch-by-patch basis in a prostate tissue image;

determine relative areal proportions of the Gleason patterns within the image;

generate a continuous risk score for the entire image based on the determined relative areal proportions;

assign at least one of the continuous risk score or risk group value, the risk group value based on the continuous risk score; and output at least one of the risk score or the risk group value.

20. The non-transitory computer-readable medium of claim 19, wherein the one or more processors are configured to execute further processor-executable instructions stored in the non-transitory computer-readable medium to use a Cox proportional hazard regression model fitted to a set of Gleason patterns or proportions thereof assigned to a multitude of images in a data set by the artificial intelligence Gleason grading model and associated survival data associated with the data set.

* * * * *